US008334447B2

(12) United States Patent
Masuda et al.

(10) Patent No.: US 8,334,447 B2
(45) Date of Patent: Dec. 18, 2012

(54) WIND INSTRUMENT AND PIPE STRUCTURE THEREOF AND A METHOD OF OPERATING THE WIND INSTRUMENT

(75) Inventors: Hideyuki Masuda, Hamamatsu (JP); Yuichiro Suenaga, Hamamatsu (JP)

(73) Assignee: Yamaha Corporation (JP)

( * ) Notice: Subject to any disclaimer, the term of this patent is extended or adjusted under 35 U.S.C. 154(b) by 0 days.

(21) Appl. No.: 13/024,647

(22) Filed: Feb. 10, 2011

(65) Prior Publication Data

US 2011/0197737 A1 Aug. 18, 2011

(30) Foreign Application Priority Data

Feb. 12, 2010 (JP) ................................ P2010-029311

(51) Int. Cl.
*G01D 9/00* (2006.01)

(52) U.S. Cl. ................................ 84/386; 84/381; 84/382

(58) Field of Classification Search .................... 84/381, 84/382, 386

See application file for complete search history.

(56) References Cited

U.S. PATENT DOCUMENTS 504,396 A * 9/1893 Maher ................................ 84/381
706,557 A 8/1902 Heckel
1,169,358 A * 1/1916 Schilzonyi ........................ 84/381
1,288,235 A * 12/1918 Schilzony ........................ 84/381
1,750,051 A * 3/1930 Rives ............................ 84/380 R
1,802,791 A * 4/1931 Stover .......................... 84/385 R
1,805,929 A * 5/1931 Stein ................................ 84/381
1,814,456 A * 7/1931 Rives ................................ 84/381
1,844,368 A * 2/1932 Rives ............................ 84/383 R
1,857,908 A * 5/1932 Hathaway, Jr. ................. 84/381
2,226,536 A 4/1940 Selmer
2,806,399 A * 9/1957 McBride ........................ 84/386
3,154,995 A * 11/1964 Kuhn ............................ 84/381
3,529,505 A * 9/1970 Brooks ........................ 84/387 R
3,570,358 A * 3/1971 Guinness .................... 84/380 C
4,515,060 A * 5/1985 Ferron ........................ 84/380 R
4,515,061 A * 5/1985 Ferron ............................ 84/394
4,516,464 A * 5/1985 Hastings .................... 84/387 R
4,714,001 A * 12/1987 Kergomard et al. ............ 84/386

(Continued)

FOREIGN PATENT DOCUMENTS

CN 2924716 Y 7/2007

(Continued)

OTHER PUBLICATIONS

European Search Report dated Jun. 15, 2011, issued in corresponding European patent application No. EP11001087.3.

(Continued)

*Primary Examiner* — Jeffrey Donels
*Assistant Examiner* — Robert W Horn
(74) *Attorney, Agent, or Firm* — Rossi, Kimms & McDowell LLP

(57) ABSTRACT

A wind instrument is constituted of a mouthpiece and a pipe structure including tapered/straight pipes. The pipe structure is constituted of a blow member and a branch pipe. The branch pipe is branched into a main pipe and an auxiliary pipe, which are straight pipes having openings and connected together in a branch shape. The blow member is connected to a branch point of the branch pipe. The branch pipe simulates resonance characteristic of a tapered pipe having a predetermined length, a predetermined distance between the upper base and the vertex, and a predetermined sectional area of the upper base commensurate with the sectional area of the main pipe.

21 Claims, 22 Drawing Sheets

U.S. PATENT DOCUMENTS

| | | | | | |
|---|---|---|---|---|---|
| 4,905,564 | A * | 3/1990 | Thayer | | 84/390 |
| 5,241,890 | A | 9/1993 | Galper | | |
| 5,309,806 | A | 5/1994 | Stavash | | |
| 5,396,825 | A * | 3/1995 | Kirts | | 84/390 |
| 5,438,156 | A | 8/1995 | Masuda et al. | | |
| 5,503,055 | A | 4/1996 | Hamanaga | | |
| 5,834,666 | A * | 11/1998 | Wanner et al. | | 84/395 |
| 5,965,833 | A * | 10/1999 | Lindberg | | 84/390 |
| 7,501,566 | B2 * | 3/2009 | Glazer | | 84/388 |
| 2011/0197737 | A1 * | 8/2011 | Masuda et al. | | 84/330 |
| 2011/0214553 | A1 * | 9/2011 | Masuda et al. | | 84/349 |
| 2011/0219936 | A1 * | 9/2011 | Masuda et al. | | 84/330 |
| 2011/0239843 | A1 * | 10/2011 | Brockman | | 84/382 |

FOREIGN PATENT DOCUMENTS

| | | | |
|---|---|---|---|
| CN | 201100904 | Y | 8/2008 |
| CN | 201163522 | Y | 12/2008 |
| DE | 583817 | C | 9/1933 |
| GB | 2344923 | A | 6/2000 |
| JP | 5143079 | A | 6/1993 |
| JP | 2707913 | B2 | 10/1997 |
| JP | 2707913 | B2 | 2/1998 |

OTHER PUBLICATIONS

European Search Report dated Jun. 10, 2011, issued in corresponding European patent application No. 11001088.1.

Masuda et al.; "Pipe Structure of Wind Instrument"; Specification and drawings of related co-pending U.S. Appl. No. 13/023,793, filed Feb. 9, 2011; 81 pages.

Masuda et al., "Pipe Structure of wind instrument"; Specification and drawings of related co-pending U.S. Appl. No. 13/024,630, filed Feb. 10, 2011; 80 pages.

US Office Action for co-pending U.S. Appl. No. 13/023,793, mail date May 29, 2012.

* cited by examiner

WIND INSTRUMENT AND PIPE STRUCTURE THEREOF AND A METHOD OF OPERATING THE WIND INSTRUMENT

BACKGROUND OF THE INVENTION

1. Field of the Invention

The present invention relates to pipe structures of wind instruments.

The present application claims priority on Japanese Patent Application No. 2010-29311 (filing date: Feb. 12, 2010), the content of which is incorporated herein by reference.

2. Description of the Related Art

Various types of music synthesizer technologies simulating sound-producing mechanisms of acoustic instruments have been developed and disclosed in various documents such as Patent Document 1, namely Japanese Patent No. 2707913. Patent Document 1 discloses a music synthesizer device which simulates and reproduces resonance characteristics of a resonance pipe having a conical surface by way of a branch joint of two straight pipes.

FIGS. 1A-1C illustrate an approximation of resonance characteristics of a resonance pipe having a conical surface. FIG. 1A is a longitudinal sectional view of a resonance pipe 200 having a conical surface 204. The resonance pipe 200 is made of a hollow circular cone having a rotation axis X1 and a vertex V, which is truncated at a position of a distance R (measured from the vertex V) and at another position of a distance (R+L) in a direction indicated by an arrow D1. An opening 201 is formed at the position of the distance (R+L) from the vertex V, whilst another opening 202 is formed at the position of the distance R from the vertex V. S denotes a hollow area of the opening 202, and S2 denotes a hollow area of the opening 201. The area S differs from the area S2 in the resonance pipe 200. That is, the resonance pipe 200 is a tapered pipe having different sectional areas at opposite ends. In this connection, the rotation axis X1 refers to a rotation axis of a tapered pipe; the opening 201 having a large sectional area refers to a lower base; the opening 202 having a small sectional area refers to an upper base; a length L between the upper base and the lower base refers to a height; and a truncated length R refers to a distance between the vertex and the upper base.

An air column 203 inside the resonance pipe 200 resonates to sound input to the opening 202. Herein, c denotes a sound velocity of input sound; p denotes an air density of the air column 203; and k denotes the wave number of sound. In the case of a perfect reflection of sound at the opening 201 without considering attenuation due to friction of air inside the resonance pipe 200, an input acoustic impedance of the resonance pipe 200 viewed in the direction D1 is expressed by Equation (1).

$$Z = \frac{j\cdot\rho\cdot c\cdot k\cdot R\cdot\sin(k\cdot L)}{S\{\sin(k\cdot L)+k\cdot R\cdot\cos(k\cdot L)\}} = \frac{1}{\dfrac{S}{j\cdot\rho\cdot c\cdot k\cdot R}+\dfrac{S}{j\cdot\rho\cdot c\cdot\tan(k\cdot L)}} \tag{1}$$

Upon substituting counterpart terms of Equation (1) with Equations (2) and (3), it is possible to produce Equation (4).

$$Z_R = \frac{j\cdot\rho\cdot c\cdot k\cdot R}{S} \tag{2}$$

$$Z_L = \frac{j\cdot\rho\cdot c\cdot\tan(k\cdot L)}{S} \tag{3}$$

$$\frac{1}{Z} = \frac{1}{Z_R}+\frac{1}{Z_L} \tag{4}$$

Equation (4) shows that Z is produced via a parallel connection of $Z_R$ and $Z_L$. Herein, $Z_R$ can be approximated to Equation (5) when kR is adequately small.

$$Z_R = \frac{j\cdot\rho\cdot c\cdot k\cdot R}{S} \approx \frac{j\cdot\rho\cdot c\cdot\tan(k\cdot R)}{S} \tag{5}$$

In Equation (5), $Z_L$ denotes an acoustic impedance of a straight pipe having the length L at an open end having the sectional area S. When kR is adequately small, $Z_R$ denotes an acoustic impedance of another straight pipe having the length R at an open end having the sectional area S. As described above, an acoustic impedance of the resonance pipe 200 is approximated by an acoustic impedance of the joint structure constituted of two straight pipes. In the following description, two pipes may approximate each other when they have similar acoustic impedances.

FIG. 1B is a longitudinal sectional view of a pipe unit 210 which approximates the resonance pipe 200. The pipe unit 210 is made of a hollow cylindrical pipe having a rotation axis X2, which are vertically cut at opposite positions. The pipe unit 210 has two openings 211 and 216, which are distanced from each other and positioned opposite to each other. Both the openings 211 and 216 have the same hollow area S. The same sectional area S is secured at any position of the pipe unit 210 perpendicular to the rotation axis X2. That is, the pipe unit 210 is a straight pipe whose sectional area is not varied at any position in the length direction. In this connection, the rotation axis X2 refers to a rotation axis of a straight pipe, and the distance between opposite openings refers to the length of a straight pipe.

Specifically, the pipe unit 210 has a joint structure constituted of a straight pipe 214 having a length L and another straight pipe 215 having a length R. The straight pipe 214 has the opening 211, whilst the straight pipe 215 has the opening 216. The same sectional area is secured in both of the straight pipes 214 and 215. In actuality, it is difficult to produce a completely straight pipe whose sectional area is not varied at any position in the length direction. Practically, pipes having very small variations of sectional areas within an allowable range of significant digits of Approximate Equation (5) can be assumed to be straight pipes. The following description is made on an assumption that the sectional area of each straight pipe is not practically varied.

The straight pipe 214 embraces an air column 213 therein. The air column 213 has the length L along the rotation axis X2 of the straight pipe 214. For the sake of convenience, the length of an air column inside a straight pipe is deemed equivalent to the length along the rotation axis of the straight pipe. In addition, the length of an air column inside a tapered pipe is deemed equivalent to the length along the rotation axis of the tapered pipe. Sound is input to a joint portion of the pipe unit 210 (indicated by an arrow D2) between the straight pipes 214 and 215. Equation (6) is created by applying a positive constant H to Equation (5).

$$Z_R = \frac{j\cdot\rho\cdot c\cdot k\cdot R}{S} = \frac{j\cdot\rho\cdot c\cdot H\cdot k\cdot R}{HS} \approx \frac{j\cdot\rho\cdot c\cdot\tan(k\cdot H\cdot R)}{HS} \tag{6}$$

Herein, kR is multiplied by H (which is adequately smaller than "1") and converted into kHR so as to produce tan(kHR), thus improving an approximation precision. When kHR is adequately small, Equation (6) shows an acoustic impedance of a straight pipe having an open end with a sectional area HS and a length HR. This indicates an approximation of the resonance pipe 200 by use of two straight pipes having different thicknesses. FIG. 1C is a longitudinal sectional view of a pipe unit 220 which approximates the resonance pipe 200. The pipe unit 220 has a joint structure constituting of a straight pipe 224 having a sectional area S and a length L and a straight pipe 225 having a sectional area HS and a length HR. An air column 223 having the length L is formed inside the straight pipe 224. Sound is input to a joint portion of the pipe unit 220 (indicated by an arrow D2) between the straight pipes 224 and 225.

FIG. 2 is a graph showing impedance curves of pipe units. Herein, IC210 denotes an impedance curve of the pipe unit 210, and IC220 denotes an impedance curve of the pipe unit 220. As shown in FIG. 2, the pipe units 210, 220 differ from each other in terms of a degree of harmony (or consonance) at peak frequencies of the impedance curves IC210, IC220. Herein, the pipe unit 220 deviates in consonance more than the pipe unit 210; hence, the pipe unit 220 may approximate the property of a tapered pipe. Patent Document 1 discloses an approximation of the resonance pipe 200 by use of a straight pipe applied to an acoustic instrument.

FIG. 3A shows an example of a wind instrument 100 in which a mouthpiece 300 is attached to an input portion of the resonance pipe 200 having the conical surface 204. A cork member is attached to the input portion of the resonance pipe 200. The input portion of the resonance pipe 200 is inserted into the mouthpiece 300 via the cork member.

FIG. 3B shows another example of a wind instrument having a branch joint, which may serve as a saxophone. This wind instrument approximates the pipe structure of the wind instrument 100 shown in FIG. 3A in which the resonance pipe 200 extends from the inside of the mouthpiece 300. Specifically, a straight pipe 231 is inserted into and mouthpiece 300 such that an opening 800 (which runs through the straight pipe 231 and the mouthpiece 300) is formed at a joint portion therebetween, wherein an attachment 801 is engaged with the opening 800. The attachment 801 implements the functionality of the foregoing straight pipe having a length HR and a sectional area HS. For the sake of convenience, the straight pipe 231 refers to a main pipe; the attachment 801 refers to an auxiliary pipe; and a branch pipe is interposed between the main pipe and the auxiliary pipe. The auxiliary pipe differs from sound holes (which will be discussed later) whose open ends are opened or closed to produce a desired pitch of sound. In contrast, an open end of the auxiliary pipe is normally opened to produce a desired pitch of sound.

Since the auxiliary pipe is disposed at the position of the mouthpiece, a small hole needs to be pierced through the mouthpiece to communicate with the auxiliary pipe. This mechanism leads to a positional fixation of the mouthpiece, which prevents a player from replacing the mouthpiece with a preferred mouthpiece.

SUMMARY OF THE INVENTION

It is an object of the present invention to provide a pipe structure of a wind instrument equipped with a branch pipe, which allows users to detachably attach desired mouthpieces to a resonance pipe.

A pipe structure of a wind instrument of the present invention includes a blow member which is connected with a mouthpiece, and a branch pipe which is branched into a main pipe and an auxiliary pipe. The blow member is connected to a branch point of the branch pipe. The main pipe or the auxiliary pipe is equipped with a pitch adjusting means which is able to produce a desired pitch in connection with an open end of the auxiliary pipe or a partial opening of the auxiliary pipe. The auxiliary pipe is equipped with an auxiliary pipe varying means which varies the length or amplitude of an air column resonating inside the auxiliary pipe. Thus, the branch pipe allows an air blown into the blow member to flow through the main pipe and the auxiliary pipe.

Preferably, the pitch adjusting means is configured of a sound hole, a bypass pipe or a slide pipe. The main pipe and the auxiliary pipe are configured of straight pipes having different lengths. The auxiliary pipe varying means includes an open/close hole formed on a side wall of the auxiliary pipe, so that the length of an air column resonating inside the auxiliary pipe is varied in response to an open/close operation of the open/close hole. In addition, the auxiliary pipe varying means includes a slide pipe attached to the auxiliary pipe, so that the length of an air column resonating inside the auxiliary pipe is varied in response to a sliding operation of the slide pipe. Furthermore, the auxiliary pipe varying means includes a bypass pipe attached to the auxiliary pipe, so that the length of an air column resonating inside the auxiliary pipe is varied in response to a pass-through which is switched over from an internal path of the auxiliary pipe to the bypass pipe.

The present invention allows a wind instrument having a branch pipe to suppress variations of tone colors.

BRIEF DESCRIPTION OF THE DRAWINGS

These and other objects, aspects, and embodiments of the present invention will be described in more detail with reference to the following drawings.

DESCRIPTION OF THE PREFERRED EMBODIMENTS

The present invention will be described in further detail by way of examples with reference to the accompanying drawings.

1. First Embodiment

Figure 3A:
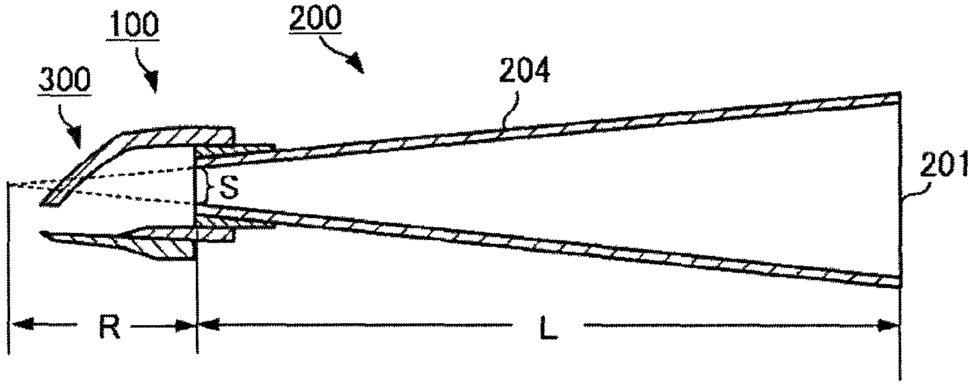
FIG. 3A is a longitudinal sectional view showing an example of a wind instrument using the conically-shaped resonance pipe shown in FIG. 1A together with a mouthpiece.
Figure 4:
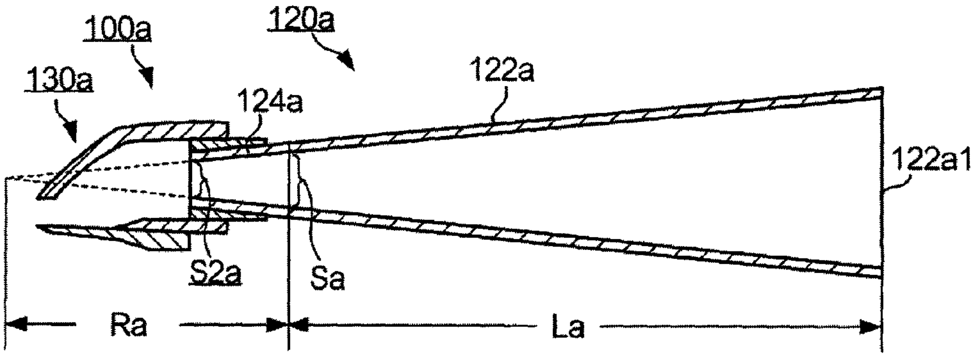
FIG. 4 is a longitudinal sectional view of a wind instrument constituted of a tapered pipe unit and a mouthpiece.

FIG. 4 illustrates a wind instrument 100*a* including a tapered pipe 122*a*. The overall shape of the wind instrument 100*a* is identical to that of the wind instrument 100 shown in FIG. 3A, whereas for the sake of illustration, the tapered pipe 120*a* is slightly modified in dimensions and divided into two sections assigned with new reference numerals. That is, reference numeral S2*a* corresponds to S in FIG. 3A; the total length of Ra and La is identical to the total length of R and L in FIG. 3A. FIG. 4 is a longitudinal sectional view of the wind instrument 10*a* which is constituted of a pipe unit 120*a* and a mouthpiece 130*a*. The pipe unit 120*a* is composed of a plastic or a metal such as a brass. The pipe unit 120*a* is constituted of tapered pipes 122*a*, 124*a*, wherein the tapered pipe 124*a* is formed continuously with the tapered pipe 122*a*. Herein, a taper ratio TR denotes an expanse per unit length along the rotation axis of a tapered shape (or a conical shape). The taper ratio TR serves as a measure representing a degree of expanse of a conical shape. Both the tapered pipes 122*a*, 124*a* have the same taper ratio TR. The tapered pipe 122*a* has a length La and a sectional area Sa at the upper base, wherein Ra denotes a length from the upper base to the vertex of the tapered pipe 122*a*. The tapered pipe 124*a* has a sectional area Sa at the lower base and a sectional area S2*a* at the upper base. The tapered pipe 124*a* is inserted into the mouthpiece 130*a* such that the upper base and its associate portion thereof are covered with the mouthpiece 130*a*.

Figure 5:
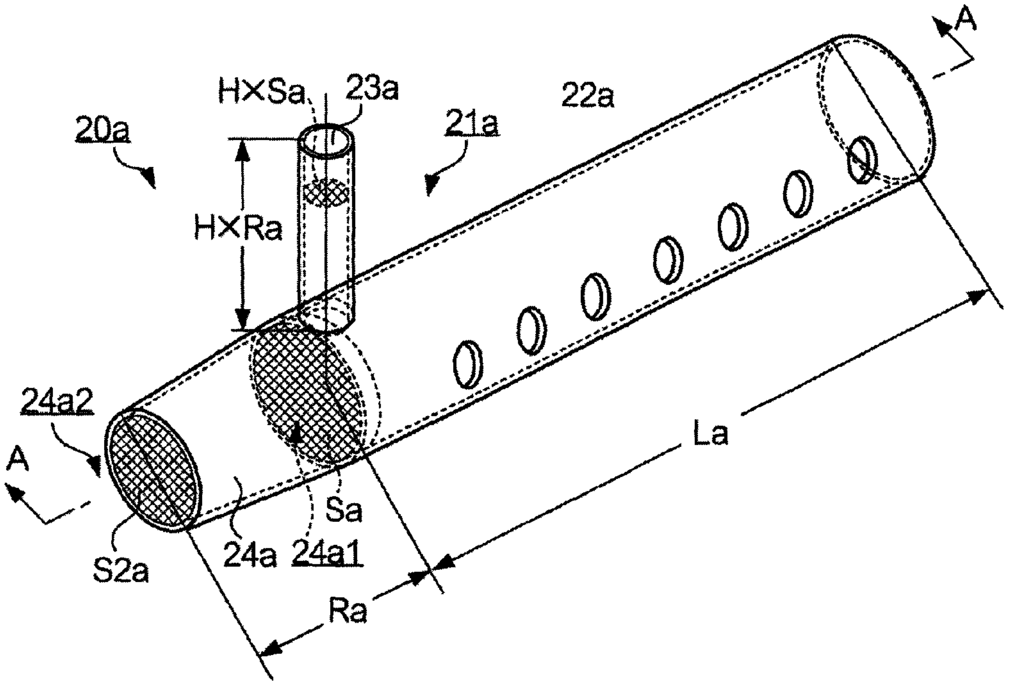
FIG. 5 is a perspective view showing the exterior appearance of a pipe structure according to a first embodiment of the present invention.

FIG. 5 shows an exterior appearance of a pipe structure 20*a* according to a first embodiment of the present invention. In FIG. 5 and its associate drawings, constituent parts are modified in dimensions in an easy-to-comprehend manner so that the dimensions thereof differ from dimensions of actual products. For the sake of clarification, sectional areas are illustrated with net-like paints. The pipe structure 20*a* is composed of a plastic or a metal such as a brass. The pipe structure

20*a* is constituted of a main pipe 22*a* (i.e. a straight pipe which is linearly extended in an axial direction), an auxiliary pipe 23*a* (i.e. a straight pipe which is linearly extended in an axial direction), and a blow member 24*a* (i.e. a tapered pipe). The main pipe 22*a* and the auxiliary pipe 23*a* are interconnected to form a branch pipe 21*a* (which is branched into the main pipe 22*a* and the auxiliary pipe 23*a*).

Figure 6A:
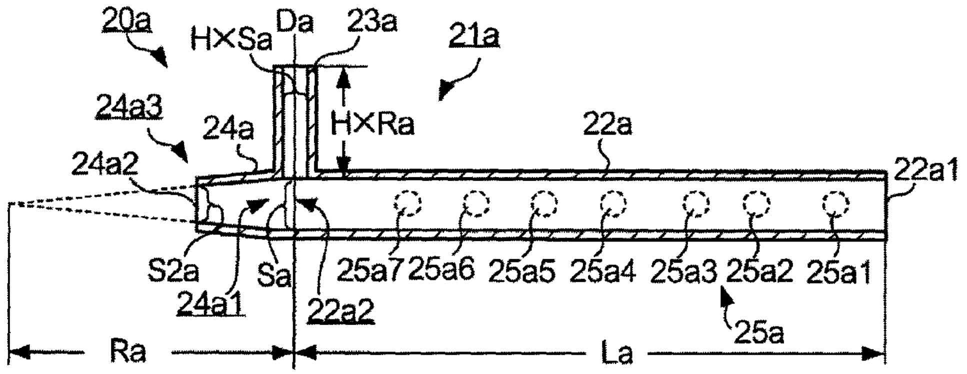
FIG. 6A is a longitudinal sectional view of the pipe structure, which is constituted of a main pipe, an auxiliary pipe and a blow member.
Figure 6B:
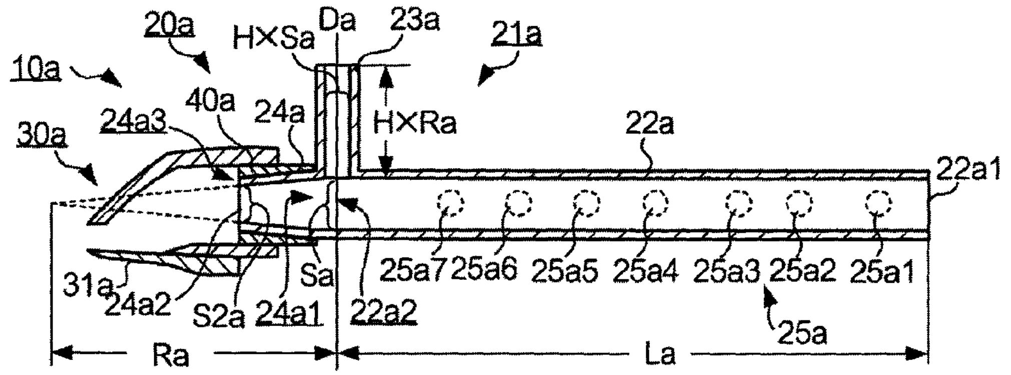
FIG. 6B is a longitudinal sectional view of a wind instrument adopting the pipe structure of FIG. 6A, which is combined with a mouthpiece via a cork member.

FIGS. 6A and 6B illustrate a wind instrument 10*a* equipped with the pipe structure 20*a* of the first embodiment, wherein parts identical to those shown in FIG. 5 are designated by the same reference numerals; hence, the description thereof will be omitted. FIG. 6A is a longitudinal sectional view of the pipe structure 20*a* taken along line A-A in FIG. 5. The blow member 24*a* has a tapered shape having upper and lower bases, wherein a hollow joint 24*a*1 is formed at the lower base whilst an opening 24*a*2 is formed at the upper base. The hollow joint 24*a*1 of the blow member 24 has an internal sectional area of Sa whilst opening 24*a*2 has an internal sectional area of S2*a* where Sa is greater than S2*a*.

The main pipe 22*a* has an opening 22*a*1 at the terminal end thereof, whilst a hollow joint 22*a*2 is formed at the opposite end. The main pipe 22*a* is connected to the blow member 24*a* with the hollow joint 22*a*2. The hollow joint 22*a*2 of the main pipe 22*a* has an internal sectional area of Sa. The main pipe 22*a* is connected to the auxiliary pipe 23*a* at the side face of the hollow joint 22*a*2. The auxiliary pipe 23*a* is connected to the main pipe 22*a* with the lower end thereof, whilst an opening is formed at the upper end. The internal space of the main pipe 22*a* is interconnected with the internal space of the auxiliary pipe 23*a*. That is, the hollow joint 22*a*2 of the main pipe 22*a* is disposed at a branch point at which the branch pipe 21*a* is branched into the main pipe 22*a* and the auxiliary pipe 23*a*. The branch pipe 21*a* is connected to the blow member 24 such that the hollow joint 22*a*2 is coupled with the hollow joint 24*a*1. According to this structure, a gas (e.g. an air) blown into a single blow member 24*a* flows into the main pipe 22*a* and the auxiliary pipe 23*a*.

FIG. 6B is a longitudinal sectional view of a wind instrument 10*a* including the pipe structure 20*a* shown in FIG. 6A. The wind instrument 10*a* is constituted of the pipe structure 20*a* and a mouthpiece 30*a*. The mouthpiece 30*a* is a part of the wind instrument 10*a* which allows a player to blow his/her breath into the pipe structure 20*a* while placing his/her lips thereon. The mouthpiece 30*a* is composed of ebonite or the like. The mouthpiece 30*a* is equipped with a flake-shaped reed 31*a* composed of a cane or the like. The mouthpiece 30*a* corresponds to conventional mouthpieces normally applied to acoustic instrument such as woodwind instruments. The mouthpiece 30*a* transmits air vibration, which occurs when a player vibrates the reed 31*a* with his/her breath, to the pipe structure 20*a*.

The blow member 24*a* is inserted into the mouthpiece 30*a* such that the opening 24*a*2 is covered with the mouthpiece 30*a*. The blow member 24*a* has a detachable-connect portion 24*a*3 which allows the mouthpiece 30*a* to attach thereto or detach therefrom. A cork member 40*a* is attached to the exterior of the blow member 24*a*. When the mouthpiece 30*a* is engaged with the blow member 24*a*, the cork member 40 is covered with the mouthpiece 30*a*. The mouthpiece 30*a* is fixed to the blow member 24*a* at a desired position while the insertion length of the mouthpiece 30*a* is adjusted to finely adjust pitches of sound produced by the wind instrument 10*a*. The mouthpiece 30*a* can be detached from the blow member 24*a* via the cork member 40*a*. Since the detachable-connect portion 24*a*3 is positioned differently from the auxiliary pie 23*a*, the wind instrument 10*a* does not need to form an opening in the mouthpiece 30*a*, which is thus different from the foregoing mouthpiece 300 shown in FIGS. 3A and 3B. For this reason, the detachable-connect portion 24*a*3 of the blow member 24*a* is able to detachably attach thereto conventional mouthpieces used in saxophones.

La denotes a distance ranged from the opening 22*a*1 of the main pipe 22*a* to a center line Da of the auxiliary pipe 23*a*. Only one terminal end of the main pipe 22*a* is opened by way of the opening 22*a*1. The auxiliary pipe 23*a* has a length H×Ra and a sectional area H×Sa. That is, the branch pipe 21*a* approximates an imaginable tapered pipe with the distance Ra from the upper base to the vertex and the distance La from the upper base to the lower base. In this connection, H denotes a positive constant smaller than "1" in Equation (6).

Figure 29:
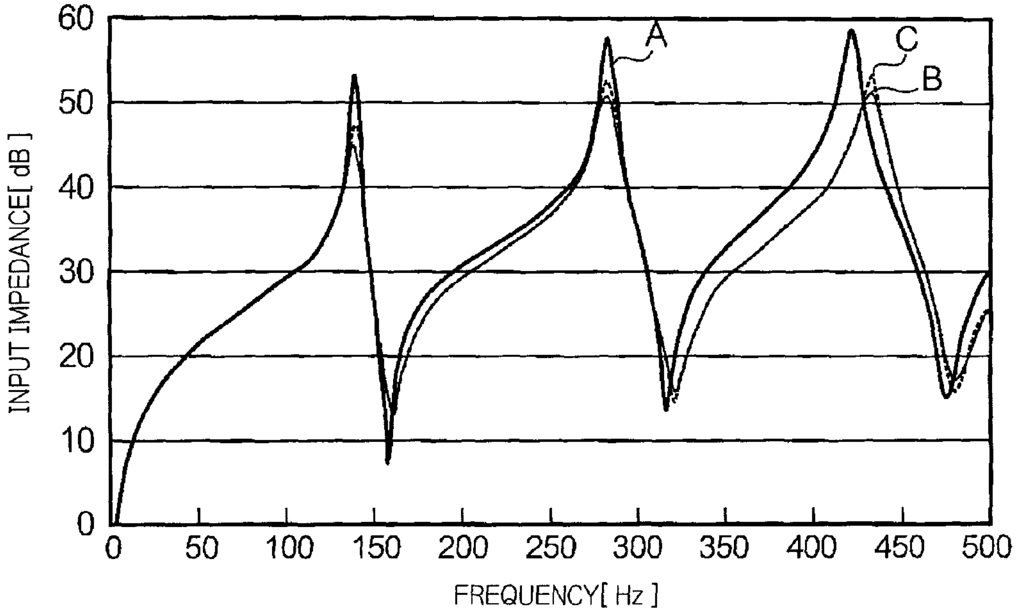
FIG. 29 is a graph showing acoustic characteristics of the wind instrument of the first embodiment shown in FIG. 5 in comparison with other wind instruments.

FIG. 29 illustrates acoustic characteristics of the wind instrument 10*a* of the first embodiment. In FIG. 29A, A denotes an input impedance curve representative of the wind instrument 100*a* of FIG. 4 in which the mouthpiece 130*a* is connected to conical pipe (i.e. the pipe unit 120*a*); B denotes an input impedance curve representative of the wind instrument 100*a* of FIG. 4 approximating the structure of FIG. 3B in which the auxiliary pipe (i.e. the attachment 801) is branched inside the mouthpiece 300, in which the sectional area S of the main pipe (i.e. the straight pipe 231) is equal to the sectional area S2*a* of the upper base of the conical pipe (i.e. the pipe unit 120*a*) shown in FIG. 4 and in which all the sound holes (not shown) are closed; and C denotes an input impedance curve representative of the wind instrument 10*a* of the first embodiment of FIG. 6B in which the branch pipe 21*a* approximates the blow member 24*a* and onwards and in which all the sound holes (i.e. sound holes 25*a*) are closed. FIG. 29 shows that compared to the input impedance curve B of the conventional branch-type wind instrument in which the auxiliary pipe is branched inside the mouthpiece, the input impedance curve C of the first embodiment is closer to the input impedance curve A of the wind instrument 100*a* of FIG. 4 particularly in terms of the peak value of a low-frequency input impedance. This proves that the present embodiment has good acoustic characteristics.

As described above, the branch pipe 21*a* approximates the tapered pipe 122*a*; hence, the tone color of the wind instrument 10*a* approximates the tone color of the wind instrument 100*a*. For the sake of clarification, two wind instruments approximate to each other when they are able to produce similar tone colors. In this connection, the branch pipe 21*a* is not necessarily limited to the foregoing shape approximating the tapered pipe 122*a*.

Referring back to FIG. 6B, the main pipe 22*a* has seven sound hones 25*a* (namely, 25*a*1, 25*a*2, 25*a*3, 25*a*4, 25*a*5, 25*a*6 and 25*a*7) which are formed on the side wall and aligned from the opening 22*a*1. A player can preferably open or close the sound holes 25*a* with his/her fingers. The length of an air column resonating in the main pipe 22*a* is varied in response to each combination of sound holes 25*a* being opened or closed, thus producing a desired pitch. These sound holes 25*a* may collectively serve as a pitch adjusting means installed in a pipe structure of a wind instrument. When a player plays the wind instrument 10*a* while opening/closing the sound holes 25*a*, the wavelength of sound resonating in the branch pipe 21*a* is varied so that sound of the wind instrument 10*a* is varied in pitches.

The wind instrument 10*a* is designed to produce sound with preset pitches corresponding to combinations sound holes 25*a* being opened/closed. When a player plays the wind instrument 10*a* with the sound holes 25*a*4-25*a*7 being closed while the sound holes 25*a*1-25*a*3 being opened, for example, the wind instrument 10*a* produces sound F. This state is expressed such that the wind instrument 10*a* is played with sound holes being opened up to 25*a*3, whereby the preset pitch of the sound hole 25*a*3 is set to F. That is, sounds D, E, F, G, A, B and C are preset to the sound holes 25*a*1, 25*a*2, 25*a*3, 25*a*4, 25*a*5, 25*a*6 and 25*a*7 respectively. The sound holes 25*a* are formed at predetermined positions with predetermined sizes to produce respective preset pitches on condition that the upper end of the auxiliary pipe 23*a* is opened. These preset pitches are illustrative and not restrictive; hence, other pitches can be set to the sound holes 25*a*; alternatively, the present pitches can be assigned to other combinations of the sound holes 25*a* being opened or closed. The number of the sound holes 25*a* formed in the main pipe 22*a*, their arrangements and sizes can be determined in light of sounds and registers of wind instruments.

2. Second Embodiment

Figure 7:
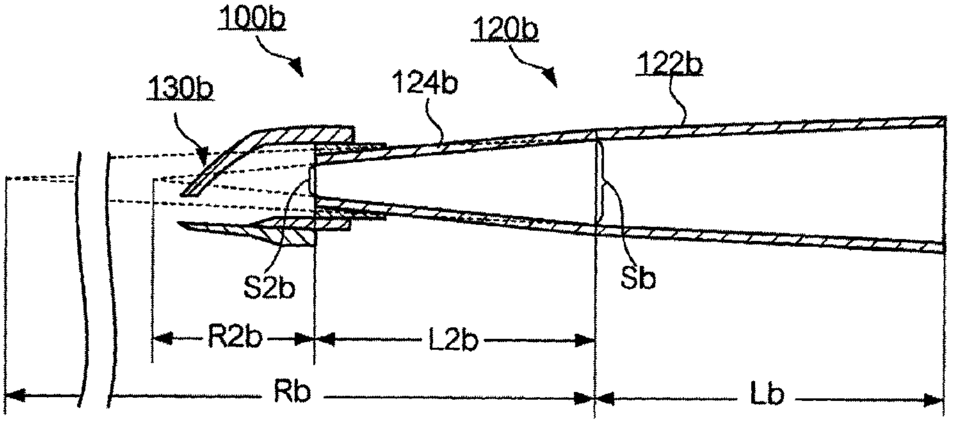
FIG. 7 is a longitudinal sectional view of a wind instrument constituted of a mouthpiece and a pipe unit including tapered pipes having different taper ratios.

FIG. 7 is a longitudinal sectional view of a wind instrument 100*b* including tapered pipes having different taper ratios. The wind instrument 100*b* is constituted of a pipe unit 120*b* and a mouthpiece 130*b*. The pipe unit 120*b* is composed of a plastic or a metal such as a brass. The pipe unit 120*b* is constituted of tapered pipes 122*b* and 124*b*, which are interconnected. The tapered pipe 122*b* has a tapered shape having upper and lower bases with a length Lb, wherein Sb denotes a sectional area at the upper base, and Rb denotes a length ranging from the upper base to the vertex. The tapered pipe 124*b* has a tapered shape having upper and lower bases with a length L2*b*, wherein Sb denotes a sectional area at the lower base; S2*b* denotes a sectional area at the upper base; and R2*b* denotes a length ranging from the upper base to the vertex. The tapered pipe 124*b* is partially inserted into the mouthpiece 130*b* such that the upper base and its associate portion are covered with the mouthpiece 130*b*.

The tapered pipes 122*b* and 124*b* differ from each other in terms of an expanse of a tapered shape (or a conical shape). Specifically, the taper ratio of the tapered pipe 122*b* is smaller than the taper ratio of the tapered pipe 124*b*. The taper ratio of the tapered pipe 124*b* is calculated by dividing the diameter of the upper base by the length R2*b* (ranging from the upper base to the vertex). The taper ratio of the tapered pipe 122*b* is calculated by dividing the diameter of the upper base by the length Rb (ranging from the upper base to the vertex).

Figure 8:
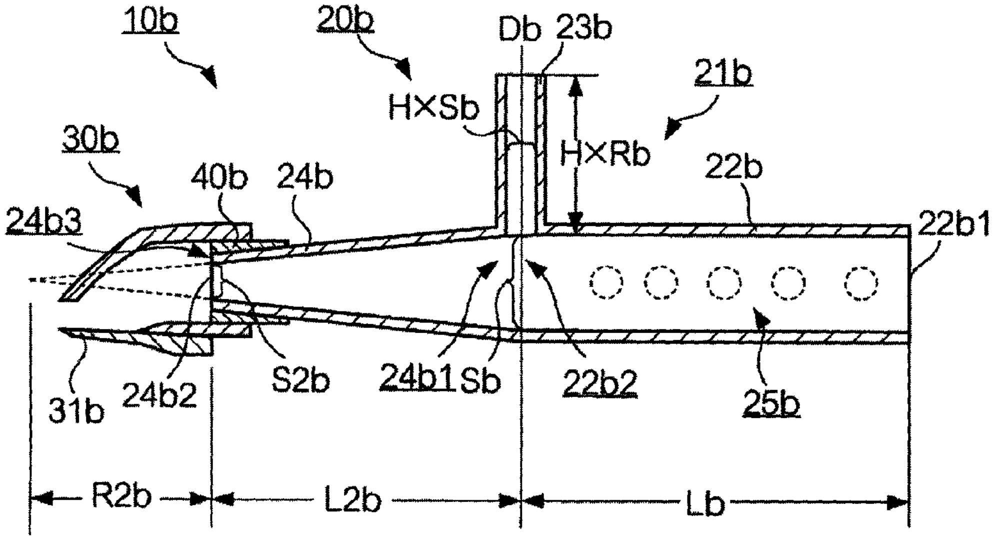
FIG. 8 is a longitudinal sectional view of a wind instrument having a pipe structure according to a second embodiment of the present invention.

FIG. 8 illustrates a pipe structure 20*b* of a wind instrument 10*b* according to a second embodiment of the present invention, wherein parts equivalent to those of the wind instrument 10*a* shown in FIG. 6B are designated by counterpart reference numbers suffixed with "b" instead of "a". The following description refers to only the differences between the wind instruments 10*a* and 10*b* while omitting the similarity therebetween. FIG. 8 is a longitudinal sectional view of the wind instrument 10*b*, which is constituted of the pipe structure 20*b* (i.e. a joint structure of a tapered pipe and a straight pipe) and a mouthpiece 30*b* (corresponding to the mouthpiece 30*a*). The pipe structure 20*b* is constituted of a branch pipe 21*b* (corresponding to the branch pipe 21*a*) and a blow member 24*b*. The branch pipe 21*b* is constituted of a main pipe 22*b* and an auxiliary pipe 23*b*.

The blow member 24*b* has a tapered shape having upper and lower bases, wherein a hollow joint 24*b*1 is formed at the lower base whilst an opening 24*b*2 is formed at the upper base. The hollow joint 24*b*1 has a sectional area Sb whilst the opening 24*b*2 has a sectional area S2*b*. The sectional Sb is larger than the sectional area S2*b*; hence, the radius of the hollow joint 24*b*1 is larger than the radius of the opening 24*b*2. The blow member 24*b* is connected to the branch pipe 21*b* with the hollow joint 24*b*1 having the large sectional area Sb. The mouthpiece 30*b* is attached to the blow member 24*b* to cover the opening 24*b*2 having the small sectional area 24*b*2. A cork member 40*b* is inserted into a gap between the blow member 24*b* and the mouthpiece 30*b*. The mouthpiece 30*b* can be attached to or detached from the blow member 24*b*. The blow member 24*b* has a detachable-connect portion 24*b*3 which the mouthpiece 30*b* is detachably attached to. This constitution allows air blown into a single blow member 24*b* to flow through the main pipe 22*b* and the auxiliary pipe 23*b*.

The wind instrument 10*b* includes the "tapered" blow member 24*b*, which provides a player with a blowing sensation, similar to that of an acoustic wind instrument having a tapered blow member, rather than another wind instrument having a "straight" blow member. By adjusting the length of the blow member 24*b*, it is possible to adjust a sensation of resistance which a player may feel when blowing his/her breath into the pipe structure 20*b*. The wind instrument 10*b* can be modified using tapered pipes having different taper ratios as follows.

In FIG. 8, Lb denotes a length ranging from the opening 22*b*1 of the main pipe 22*b* to a center line Db of the auxiliary pipe 23*b*. Only one terminal end of the main pipe 22*b* is opened by way of the opening 22*b*1, wherein the auxiliary pipe 23*b* has a length of H×Rb and a sectional area of H×Sb. In this case, the branch pipe 21*b* can be approximated to an imaginable tapered pipe with the length Rb ranging from the upper base to the vertex, the sectional area Sb at the upper base, and the length Lb ranging from the upper base to the lower base. Herein, H denotes a positive constant in Equation (6). The blow member 24*b* has the same shape as the tapered pipe 124*b*. The wind instrument 10*b* having this constitution is able to reproduce sound of the wind instrument 100*b* including tapered pipes of different taper ratios. In this connection, the branch pipe 21*b* is not necessarily limited to an approximate shape of the tapered pipe 122*b*.

3. Third Embodiment

Figure 9:
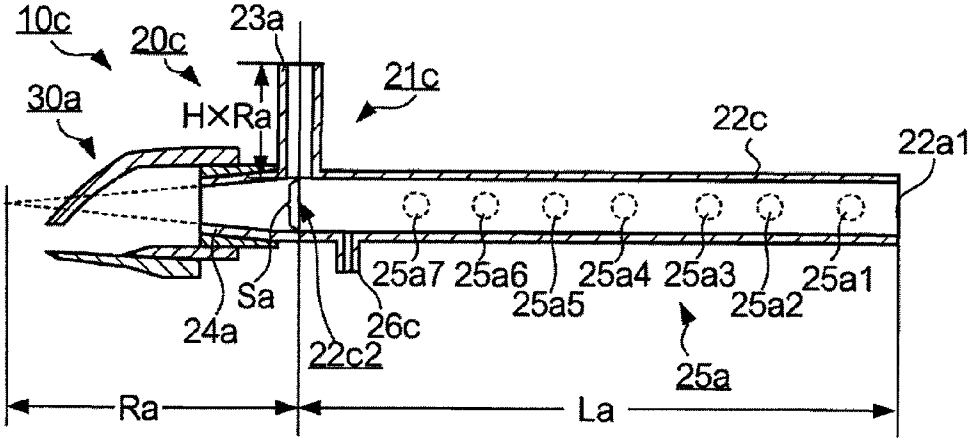
FIG. 9 is a longitudinal sectional view of a wind instrument having a pipe structure according to a third embodiment of the present invention.

FIG. 9 illustrates a pipe structure 20*c* of a wind instrument 10*c* according to a third embodiment of the present invention. FIG. 9 is a longitudinal sectional view of the wind instrument 10*c*, wherein parts identical to those of the wind instrument 10*a* will be designated by the same reference numerals; hence, the description thereof will be omitted. The wind instrument 10*c* differs from the wind instrument 10*a* in terms of some parts, dimensions and quantity; hence, the following description will be made with respect to only the differences therebetween while omitting the counterpart components therebetween by use of the same reference numerals suffixed with "c" instead of "a". An octave hole 26*c* is formed in proximity to a hollow joint 22*c*2 of a main pipe 22*c* in the wind instrument 10*c*. When a player plays the wind instrument 10*c* while closing the octave hole 26*c*, standing waves whose wavelengths are consummate with the preset pitches of the sound holes 25*a* occur inside the pipe structure 20*c*. When a player plays the wind instrument 10*c* while opening the octave hole 26*c*, standing waves are affected and converted into other standing waves with half the wavelengths, producing sounds whose pitches are one-octave higher than the preset pitches of the sound holes 25*a*.

4. Fourth Embodiment

Figure 10:
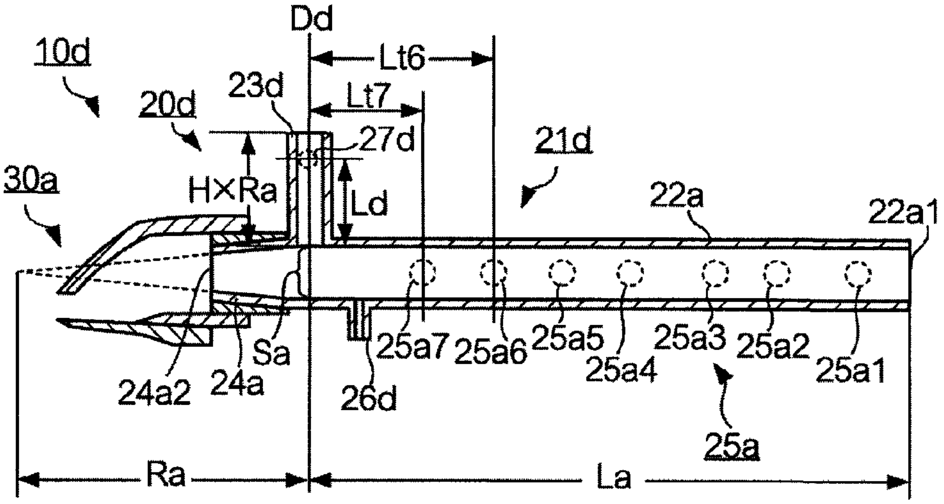
FIG. 10 is a longitudinal sectional view of a wind instrument having a pipe structure according to a fourth embodiment of the present invention.

FIG. 10 illustrates a pipe structure 20*d* of a wind instrument according to a fourth embodiment of the present invention. FIG. 10 is a longitudinal sectional view of the wind instrument 10*d*, wherein parts identical to those of the wind instrument 10*a* are designated by the same reference numerals; hence, the description thereof will be omitted. The wind instrument 10*d* differs from the wind instrument 10*a* in terms of the shape, dimensions and quantity; hence, the following description will be given with respect to only the differences therebetween while omitting the counterpart components therebetween by use of the same reference numerals suffixed with "d" instead of "a". The pipe structure 20*d* is constituted of the main pipe 22*a* and the blow member 24*a* as well as an auxiliary pipe 23*d*. An octave hole 26*d* is formed in proximity to the hollow joint 22*a*2 of the main pipe 22*a*. The auxiliary pipe 23*d* is a straight pipe in which the lower end thereof is connected to the main pipe 22*a* while the upper end is opened, so that the internal space of the main pipe 22*a* is interconnected to the internal space of the auxiliary pipe 23*d*. An open/close hole 27*d*, which is opened or closed upon a player's operation, is formed on the side wall of the auxiliary pipe 23*d*. The open/close hole 27*d* is positioned at a height Ld above the lower end of the auxiliary pipe 23*d* connected to the main pipe 22*a*. Herein, Lt denotes an interval of distance (namely, a sound-hole distance) from a center line Dd of the auxiliary pipe 23*d* to each sound hole 25*a*. For instance, Lt7 denotes a sound-hole distance of the sound hole 25*a*7 from the center line Dd. The sound-hole distance Lt represents the length of an air column resonating inside the main pipe 22*a*.

When a player plays the wind instrument 10*d* while opening the sound hole(s) 25*a*, the pipe structure 20*d* undergoes an intense state or a weak state in an even-number mode of resonance. For instance, the sound holes 25*a*1 through 25*a*5 cause the pipe structure 20*d* to undergo the intense state in an even-number mode of resonance. In an open state of the octave hole 26*d*, it is possible to easily produce sound one octave higher than the preset pitches of the sound holes 25*a*1-25*a*5. In contrast, the sound holes 25*a*6 and 25*a*7 cause the pipe structure 20*d* to undergo the weak state in an even-number mode of resonance because the sound-hole distances Lt thereof are shorter than the length of the auxiliary pipe 23*d*. In addition, the second-mode resonance frequency becomes higher than twice the first-mode resonance frequency which is commensurate with a register one octave higher than the first-mode resonance frequency. For this reason, when a player plays the wind instrument 10*d* while opening the sound holes up to the sound hole 25*a*6 or 25*a*7 in the open state of the octave hole 26*d*, it is difficult to produce sound one octave higher than the preset pitches. In addition, the sound in this state unexpectedly increases in pitch so as to cause a difference of tone color compared to sound in another register.

In order to produce sound one octave higher than the preset pitch of the sound hole 25*a*6 or 25*a*7, a player needs to play the wind instrument 10*d* in the open state of the octave hole 26*d* and the open/close hole 27*d*. Compared to the performance of the wind instrument 10*d* in the close state of the open/close hole 27*d*, it is possible to reduce the length of an air column resonating in the auxiliary pipe 23*d* in the open state of the open/close hole 27*d*. Thus, it is possible to change the length of an air column resonating in the auxiliary pipe 23*d* in response to the open/close state of the open/close hole 27*d*. In this connection, the open/close hole 27*d* may serve as an auxiliary pipe varying means. At this time, the auxiliary pipe 23*d* functions as an auxiliary pipe having the fixed length Ld, which may be longer than the sound-hole distance Lt, thus intensifying the even-number mode of resonance in the pipe structure 20*d*. Thus, the wind instrument 10*d* is able to easily produce sound one octave higher than all the preset pitches of the sound holes 25*a* in the overall register; hence, it is possible to produce sound with preferable pitches and tone colors.

When a player plays the wind instrument 10*d* in the close state of the octave hole 26*d*, the wind instrument 10*d* produces sound with the preset pitches of the sound holes 25*a*. In this state, the tone color is varied in response to the open/close state of the open/close hole 27*d*. This constitution allows a player to change pitches and/or tone colors during performance of the wind instrument 10*d* in progress by operating the open/close hole 27*d* of the auxiliary pipe 23*d*. The wind instrument 10*d* is equipped with an indicator means indicating production of sound one octave higher than the preset pitches. In addition, the wind instrument 10*d* can be further equipped with an open/close mechanism for opening/closing one of or both of the octave hole 26*d* and the open/close hole 27*d* in response to the content of the indicator means and the open/close state of the sound holes 25*a*. In this connection, it is possible to form a plurality of open/close holes 27*d* in the wind instrument 10*d*, whereby a player is able to adjust the length of an air column resonating in the auxiliary pipe 23*d* by opening/closing the open/close holes 27*d* in response to the open/close states of the sound holes 25*a*. Alternatively, the same effect can be achieved by opening at least one of the open/close holes 27*d*, which are aligned along the auxiliary pipe 23*d*, while closing the terminal end of the auxiliary pipe 23*d*. It is preferable that a partial opening be formed in the auxiliary pipe 23*d* or that the terminal end be opened.

5. Variations

The present invention is not necessarily limited to the foregoing embodiments, which can be further modified in various ways.

(1) First Variation

The first, third and fourth embodiments are designed to use the "tapered" blow member 24*a*, whereas they can be modified to use a "straight" blow member. In this case, all the main pipe, auxiliary pipe and blow member are configured of straight pipes. This wind instrument employing straight pipes is designed to approximate the property of the wind instrument 100*a* including the tapered pipes 122*a* and 124*a* shown in FIG. 4.

Figure 11:
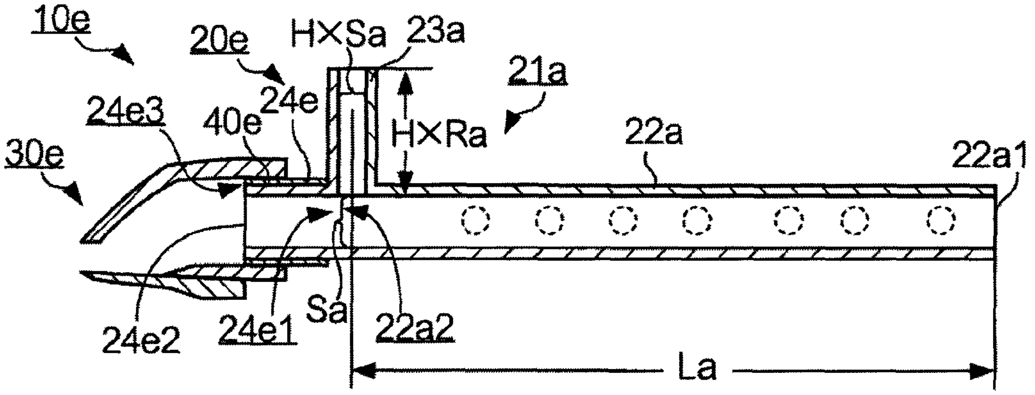
FIG. 11 is a longitudinal sectional view of a wind instrument according to a first variation.

FIG. 11 is a longitudinal sectional view of a wind instrument 10*e* according to a first variation, wherein parts identical to those of the wind instrument 10*a* are designated by the same reference numerals suffixed with "e" instead of "a"; hence, the description thereof will be omitted. The following description refers to only the difference between the wind instruments 10*a* and 10*e* while omitting the similarity therebetween. The wind instrument 10*e* is constituted of a pipe structure 20*e* and a mouthpiece 30*e*, wherein the pipe structure 20*e* includes the main pipe 22*a*, the auxiliary pipe 23*a*, and a blow member 24*e*, all of which are straight pipes. The pipe structure 20*e* is composed of a metal such as a brass. The pipe structure 20*e* includes a "straight" blow member 24*e*, the exterior surface of which is covered with a cork member 40*e*. The blow member 24*e* is inserted into the mouthpiece 30*e* via the cork member 40*e*. The blow member 24*e* has an opening 24*e*2 in the side of the mouthpiece 30*e*. The mouthpiece 30*e* is detachably attached to the blow member 24*e* on which exterior surface the cork member 40*e* is adhered. The mouthpiece 30*e* is attached to or detached from a detachable-connect portion 24*e*3 of the blow member 24*e*. In this connection, the mouthpiece 30*e* can be fixed to the pipe structure 20*e*.

A hollow joint 24*e*1 having a sectional area Sa is formed opposite to the opening 24*e*2 of the blow member 24*e*. The blow member 24*e* is connected to the branch pipe 21*a* such that the hollow joint 24*e*1 is coupled with the hollow joint 22*a*2 of the main pipe 22. According to this constitution, the wind instrument 10*e* approximates an imaginary wind instrument in which the blow member 24*e* is connected to the tapered pipe 122*a* shown in FIG. 4. As blow members, wind instruments can adopt any types of pipes such as tapered pipes and straight pipes. In this connection, blow members can be modified such that certain portions thereof serve as tapered pipes while other portions serve as straight pipes.

Figure 30:
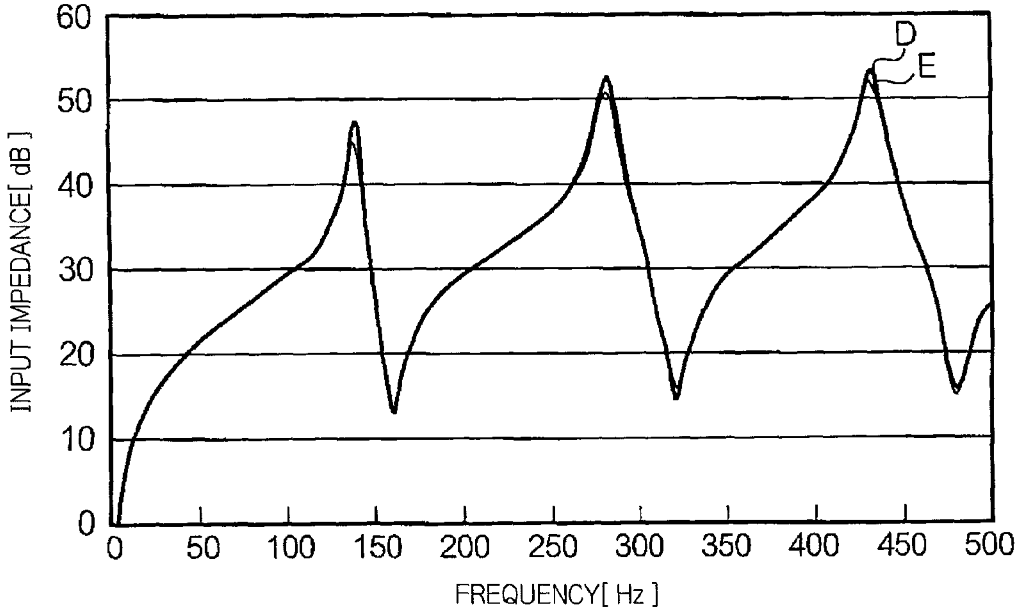
FIG. 30 is a graph showing acoustic characteristics of the wind instrument of the first variation shown in FIG. 11 in comparison with other wind instruments.

FIG. 30 illustrates acoustic characteristics of the wind instrument 10*e* of the first variation. In FIG. 30, D denotes an input impedance curve of the wind instrument 10*a* of the first embodiment shown in FIG. 6B in which the branch pipe 21*a* approximates the blow member 24*a* and onwards and in which all the sound holes 25*a* are closed; and E denotes an input impedance curve of the wind instrument 10*e* of the first variation shown in FIG. 11 in which the blow member 24*a* is replaced with a straight pipe (i.e. the blow member 24*e*) and in which all the sound holes are closed.

Through comparison between the input impedance curves D and E, even though the wind instrument 10*e* of the first variation has a simple constitution including the straight blow member 24*e*, the wind instrument 10*e* has the same input impedance curve as the wind instrument 10*a*; hence, the wind instrument 10*e* has good acoustic characteristics as the wind instrument 10*a*. That is, the first variation is able to satisfy preferable acoustic characteristics while simplifying the manufacturing process because of the straight shape of the blow member 24*e* including the detachable-connect portion 24*e*3.

(2) Second Variation

The foregoing embodiments adopt a single-reed mouthpiece (i.e. a mouthpiece using a single flake-shaped reed) in wind instruments; however, the present invention is applicable to wind instruments adopting double-reed mouthpieces or lip-reed mouthpieces.

Figure 12:
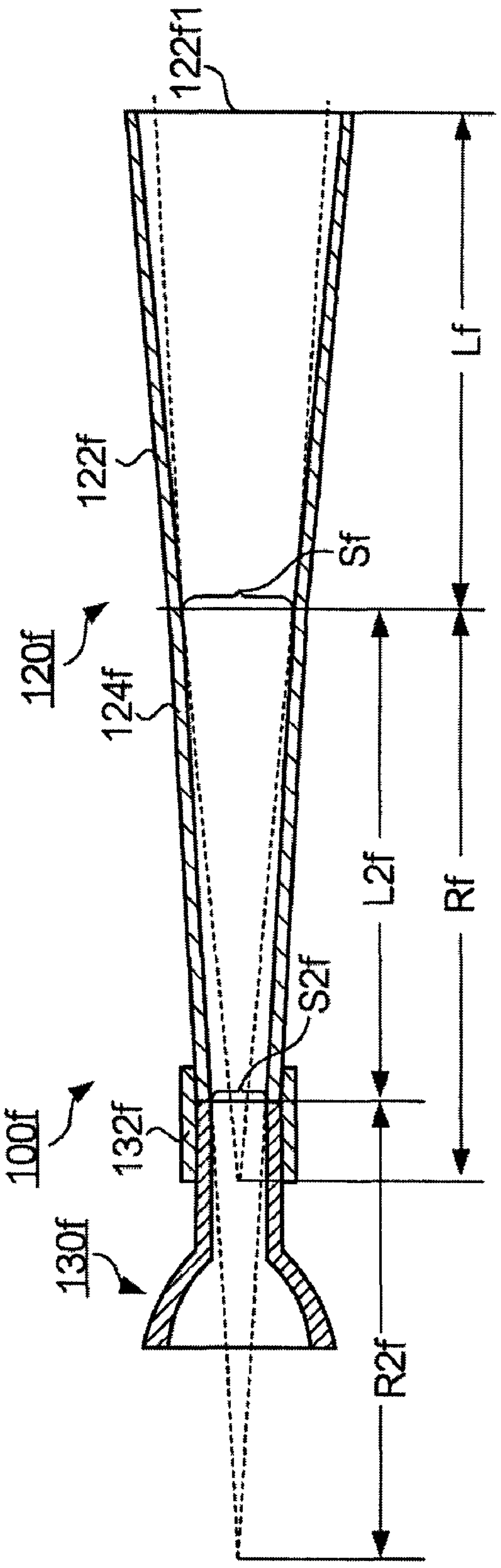
FIG. 12 is a longitudinal sectional view of a wind instrument adopting a lip-reed mouthpiece.

FIG. 12 illustrates a wind instrument adopting a lip-reed mouthpiece. FIG. 12 is a longitudinal sectional view of a wind instrument 100*f*, which is constituted of a pipe unit 120*f*, a mouthpiece 130*f* and a mouthpiece attachment 132*f*. The mouthpiece attachment 132*f* is adhered to the pipe unit 120*f*. All the pipe unit 120*f*, the mouthpiece 130*f* and the mouthpiece attachment 132*f* are composed of a metal such as a brass. The pipe unit 120*f* is constituted of tapered pipes 122*f* and 124*f*, which are continuously connected with each other. The tapered pipes 122*f* and 124*f* are portions of the pipe unit 120*f*. The tapered pipe 122*f* has a tapered shape having upper and lower bases with a length Lf, wherein Sf denote a sectional area of the upper base, and Rf denotes the length ranging from the upper base to the vertex. The tapered pipe 124*f* has a tapered shape having upper and lower bases with a length L2*f*, wherein S2*f* denotes a sectional area of the upper base, Sf denotes a sectional area of the lower base, and R2*f* denotes a length ranging from the upper base to the vertex. In this illustration, the taper ratio of the tapered pipe 122*f* is larger than the taper ratio of the tapered pipe 124*f*.

Figure 13:
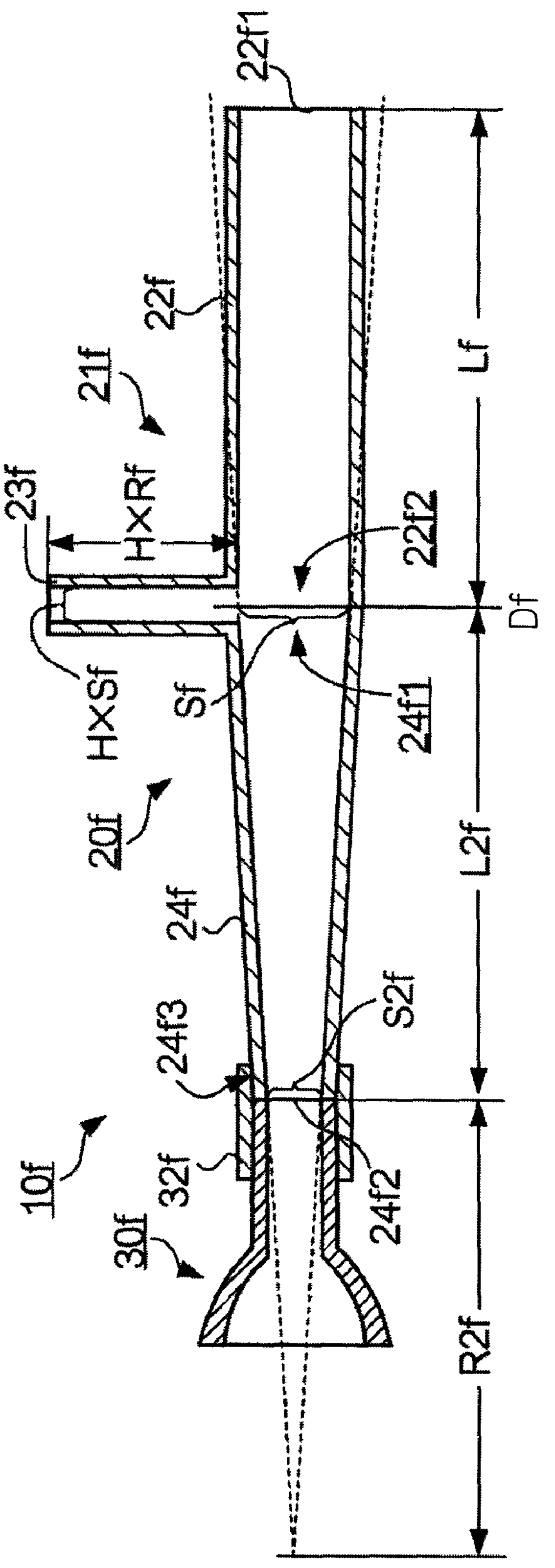
FIG. 13 is a longitudinal sectional view of a wind instrument including a mouthpiece and a pipe structure according to a second variation.

FIG. 13 illustrates a wind instrument 10*f* including a pipe structure 20*f* according to a second variation, wherein parts equivalent to those of the wind instrument 100*f* are designated by the two-digit reference numerals precluding hundredth places from three-digit reference numerals shown in FIG. 12; hence, the description thereof will be omitted. FIG. 13 is a longitudinal sectional view of the wind instrument 10*f*, which is constituted of the pipe structure 20*f* (including a straight pipe and a tapered pipe) and a mouthpiece 30*f*. The pipe unit 20*f* is composed of a metal such as a brass. The pipe unit 20*f* includes a tapered blow member 24*f* including a hollow joint 24*f*1 (disposed at the lower base) and an opening 24*f*2 (disposed at the upper base), wherein Sf denotes a sectional area of the hollow joint 24*f*1, and S2*f* denotes a sectional area of the opening 24*f*2 (where Sf>S2*f*).

The blow member 24*f* has a detachable-connect portion 24*f*3 at the opening 24*f*2, allowing the mouthpiece 30*f* to be detachably attached thereto. A mouthpiece attachment 32*f* is attached to the detachable-connect portion 24*f*3 of the blow member 24*f*. The mouthpiece 30*f* is engaged with the mouthpiece attachment 32*f* and thereby fixed in position. The mouthpiece 30*f* is a component of a wind instrument which comes in contact with player's lips and which player's breath is blown into. The mouthpiece 30*f* is composed of a brass or the like. A player vibrates his/her lips placed on the mouthpiece 30*f* so as to cause an air vibration which serves as a sound source of the wind instrument 10*f*. The mouthpiece 30*f* inputs an air vibration into the blow member 24*f*. Since the detachable-connect portion 24*f*3 of the blow member 24*f* is positioned differently from an auxiliary pipe 23*f*, the wind instrument 10*f* does not need to form an opening in the mouthpiece 30*f*, which is thus different from the mouthpiece 300 shown in FIGS. 3A and 3B. That is, it is possible to detachably attach conventional mouthpieces adopted in trumpets to the detachable-connect portion 24*f*3 of the blow member 24*f*.

The pipe structure 20*f* includes a branch pipe 21*f* constituted of the main pipe 22*f* and the auxiliary pipe 23*f*, both of which are straight pipes. The main pipe 22*f* has an opening 22*f*1 at one end thereof, whilst a hollow joint 22*f*2 is formed at the other end. The main pipe 22*f* is connected to the auxiliary pipe 23*f* with the side portion of the hollow joint 22*f*2. The lower end of the auxiliary pipe 23*f* is connected to the main pipe 22*f*, whilst the upper end is opened. The internal space of the main pipe 22*f* is interconnected to the internal space of the auxiliary pipe 23*f*. That is, the hollow joint 22*f*2 is disposed at a branch point at which the branch pipe 21*f* is branched into the main pipe 22*f* and the auxiliary pipe 23*f*. The branch pipe 21*f* is connected to the blow member 24*f* such that the hollow joint 22*f*2 is coupled with the hollow joint 24*f*1. Herein, Lf denotes a distance ranging from the opening 22*f*1 of the main pipe 22*f* to a center line Df of the auxiliary pipe 23*f*. In order to approximate the tapered pipe 122*f* with the length Rf ranging from the upper base to the vertex and the sectional area Sf at the upper base (see FIG. 12), the auxiliary pipe 23*f* of the branch pipe 21*f* is designed with a length of H×Rf and a cross section of H×Sf, where H denotes a positive constant in Equation (6).

According to this constitution, the wind instrument 10*f* is able to produce preferable sound with the tone color approximating the wind instrument 100*f* including a lip-reed mouthpiece and a resonance pipe continuously connecting two conical shapes of different taper ratios. The second variation is designed to use the tapered blow member 24*f*, which can be replaced with a straight blow member. The branch pipe 21*f* of the second variation is constituted of the main pipe 22*f* and the auxiliary pipe 23*f*, one of which or both of which can be configured of tapered pipes.

(3) Third Variation

In the wind instrument 10*c* of the third embodiment shown in FIG. 9, the octave hole 26*c* is formed in the main pipe 22*c*; but this is not a restriction. The octave hole 26*c* can be formed at another position. When the sound-hole distance Lt7 is shorter than the length of the auxiliary pipe 23*a*, for example, a node of a second-mode standing wave emerges inside the auxiliary pipe 23*a*. In this case, it is impossible to produce sound one octave higher than the preset pitch of the sound hole 25*a*7 in the open state of the octave hole 26*c* disposed in proximity to the hollow joint 22*c*2. To solve this drawback, it is possible to form an octave hole in the auxiliary pipe 23*a*. Alternatively, it is possible to form octave holes in both the main pipe 22*c* and the auxiliary pipe 23*a*.

Figure 14:
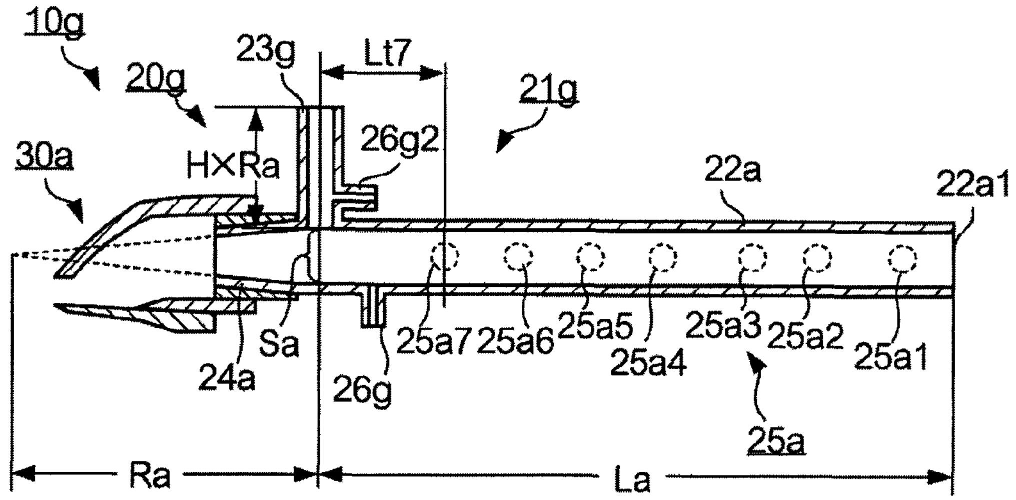
FIG. 14 is a longitudinal sectional view of a wind instrument including a mouthpiece and a pipe structure according to a third variation.

FIG. 14 illustrates a wind instrument 10*g* having a pipe structure 20*g* according to a third variation. FIG. 14 is a longitudinal sectional view of the wind instrument 10*g* which is constituted of the main pipe 22*a*, the blow member 24*a* and the mouthpiece 30*a*, wherein parts identical to those of the wind instrument 10*c* shown in FIG. 9 are designated by the same reference numerals. In the wind instrument 10g, an octave hole 26g is formed on the side wall of the blow member 24a connected with the main pipe 22a. In addition, a secondary octave hole 26g2 is formed on the side wall of an auxiliary pipe 23g (which replaces the auxiliary pipe 23a shown in FIG. 9). When a player plays the wind instrument 10g in the close state of the octave holes 26g and 26g2, a standing wave whose wavelength is commensurate with the preset pitches of the sound holes 25a occurs inside the pipe structure 20g. When a player plays the wind instrument 10g with the octave hole 26g being opened while the secondary octave holes 26g2 being closed, the wind instrument 10g produces sound one octave higher than the preset pitches of the sound holes 25a1-25a7. In contrast, when a player plays the wind instrument 10g with the octave hole 26g being closed and the octave hole 26g2 being opened, the wind instrument 10g produces sound one octave higher than the preset pitch of the sound hole 25a7. According to this structure, even when the sound-hole distance is shorter than the length of the auxiliary pipe 23g, the wind instrument 10g is able to produce sound one octave higher than the preset pitch with the octave holes 26g and 26g2 being properly operated.

(4) Fourth Variation

The octave hole 26c is formed in the main pipe 22c in the wind instrument 10c of the third embodiment, whilst the octave holes 26g and 26g2 are formed in the main pipe 22a and the auxiliary pipe 23g in the wind instrument 10g of the third variation. Octave holes can be formed at other positions of the pipe structure 20c/20g. When the sound-hole distance Lt7 is shorter than the length of the blow member 24a, for example, a node of a second-mode standing wave occurs inside the blow member 24a. In this case, the wind instrument 10c is unable to produce the preset pitch C of the sound hole 25a7 in the open state of the octave hole 26c disposed in proximate to the hollow joint 22c2 of the main pipe 22c. To solve this drawback, it is possible to form an octave hole in the blow member 24a. Alternatively, octave holes can be formed in the main pipe 22c and the blow member 24a; or octave holes can be formed in the main pipe 22c, the auxiliary pipe 23a and the blow member 24a.

Figure 15:
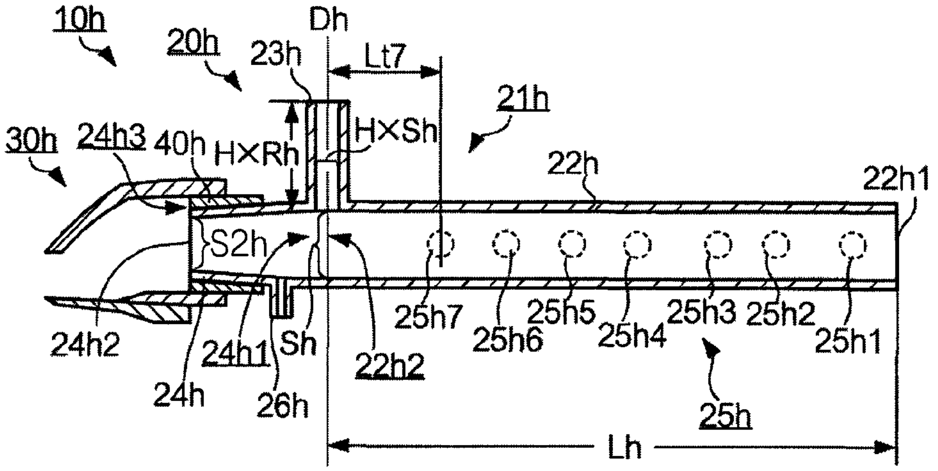
FIG. 15 is a longitudinal sectional view of a wind instrument including a mouthpiece and a pipe structure according to a fourth variation.

FIG. 15 illustrates a wind instrument 10h having a pipe structure 20h according to a fourth variation. FIG. 15 is a longitudinal sectional view of the wind instrument 10h, which is constituted of the pipe structure 20h (including a tapered pipe and a straight pipe) and a mouthpiece 30h. The pipe structure 20h is composed of a metal such as a brass. The pipe structure 20h includes a blow member 24h which is a tapered pipe. The blow member 24h has a hollow joint 24h1 at the lower base and an opening 24h2 at the upper base, wherein Sh denotes a sectional area of the hollow joint 24h1, and S2h denotes a sectional area of the opening 24h2 (where Sh>S2h). The radius of the hollow joint 24h1 is larger than the radius of the opening 24h2. The mouthpiece 30h is attached to the blow member 24h at the opening 24h2 having a small radius.

A cork member 40h is inserted into a gap between the blow member 24h and the mouthpiece 30h. The mouthpiece 30h and the cork member 40h are detachably attached to the blow member 24h. The blow member 24h has a detachable-connect portion 24h3, which allows the mouthpiece 30h to be attached thereto. In this connection, the mouthpiece 30h can be fixed to the pipe structure 20h. The sectional area Sh of the lower base of the blow member 24h (which commensurate with the cross section of the main pipe 22h) is larger than the sectional area Sa of the lower base of the blow member 24a adapted to the wind instrument 10a shown in FIG. 6A. Through comparison between the wind instrument 10a of FIG. 6A and the wind instrument 10h of FIG. 15, the blow member 24h is larger than the blow member 24a; the mouthpiece 30h is larger than the mouthpiece 30a; and the distance between the hollow joint 24h1 and the opening 24h2 of the blow member 24 is larger than the distance between the hollow joint 24a1 and the opening 24a2 of the blow member 24a. That is, the distance between the tip end of the mouthpiece 30h (which is apart from the blow member 24h) and the hollow joint 24h1 of the blow member 24h is larger than the distance between the tip end of the mouthpiece 30a and the hollow joint 24a1. An octave hole 26h is formed in the blow member 24h in proximity to the hollow joint 24h1 rather than the detachable-connect portion 24h3.

The pipe structure 20h has a branch pipe 21h which is branched into a main pipe 22h and an auxiliary pipe 23h, both of which are straight pipes. The main pipe 22h has an opening 22h1 at one end thereof, whilst a hollow joint 22h2 is formed at the other end. The main pipe 22h is connected to the auxiliary pipe 23h with the side portion of the hollow joint 22h2. The lower end of the auxiliary pipe 23h is connected to the main pipe 22h, whilst the upper end is opened. The internal space of the main pipe 22h is interconnected to the internal space of the auxiliary pipe 23h. That is, the hollow joint 22h2 of the main pipe 22h is disposed at a branch point at which the branch pipe 21h is branched into the main pipe 22h and the auxiliary pipe 23h. The branch pipe 21h is connected to the blow member 24h such that the hollow joint 22h2 is coupled with the hollow joint 24h1. Herein, Lh denotes a distance ranging from the opening 22h1 of the main pipe 22h to a center line Dh of the auxiliary pipe 23h. In order to approximate an imaginary tapered pipe with a length Rh ranging from the upper base to the vertex and a sectional area Sh of the upper base, the auxiliary pipe 23h of the branch pipe 21h is formed with a length of H×Rh and a sectional area of H×Sh, wherein H denotes a positive constant in Equation (6).

According to this constitution, when a player plays the wind instrument 10h in the open state of an octave hole 26h which is formed on the side wall of the blow member 24h, the wind instrument 10h is able to produce sound one octave higher than preset pitches of sound holes 25h (i.e. sound holes 25h1 through 25h7). As described above, an octave hole needs to be disposed at a position commensurate with the length of an air column resonating in a main pipe, an auxiliary pipe or a blow member in a wind instrument. In addition, when the length of a resonating air column, which is varied in response to the sound holes 25h (or a pitch adjusting means), is shorter than the predetermined length, an octave hole needs to be disposed in the auxiliary pipe 23h or the blow member 24h. It is possible to arrange a plurality of octave holes whose open/close states are indicated by an indicator means. In this case, the wind instrument 10h is further equipped with an open/close mechanism for opening/closing octave holes in response to the content of the indicator means and the open/close states of the sound holes 25h.

(5) Fifth Variation

The wind instrument 10d of the fourth embodiment shown in FIG. 10 allows a player to change pitches and tone colors during performance in progress by operating the open/close hole 27d. Instead, it is possible to change pitches and tone colors of the wind instrument 10d by changing the length of the auxiliary pipe 23d.

Figure 16A:
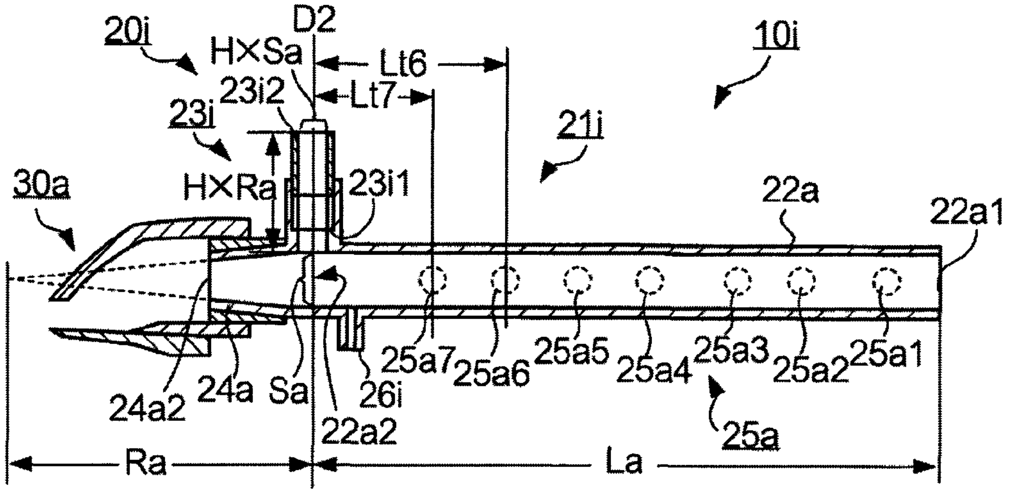
FIG. 16A is a longitudinal sectional view of a wind instrument including a mouthpiece and a pipe structure according to a fifth variation.
Figure 16B:
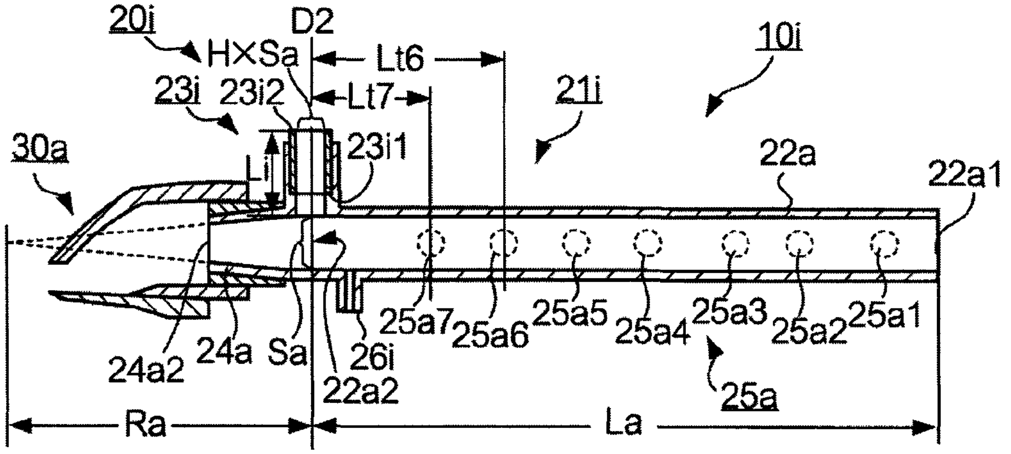
FIG. 16B is a longitudinal sectional view of the wind instrument shown in FIG. 16A, in which an auxiliary pipe is shortened in length.

FIGS. 16A and 16B illustrate a wind instrument 10i having a pipe structure 20i according to a fifth variation, wherein parts identical to those of the wind instrument 10a are designated by the same reference numerals; hence, the description thereof will be omitted. In the pipe structure 20i, an octave hole 26i is formed in proximity to the hollow joint 22a2 of the main pipe 22*a*. An auxiliary pipe 23*i* has a fixed portion 23*i*1 which is fixed to the main pipe 22*a*. The fixed portion 23*i*1 of the auxiliary pipe 23*i* is configured of a straight pipe composed of a brass or the like. The auxiliary pipe 23*i* includes a slide pipe 23*i*2 which is a straight pipe composed of a brass or the like. The slide pipe 23*i*2 is inserted into the fixed portion 23*i*1 such that it can vertically move within a predetermined range. In FIG. 16A, the slide pipe 23*i*2 is disposed at an upper position indicating a length H×Ra of the auxiliary pipe 23*i*. In FIG. 16B, the slide pipe 23*i*2 moves downward to a lower position indicating a length Li of the auxiliary pipe 23*i*. Vertical movement of the slide pipe 23*i*2 changes the length of an air column resonating inside the auxiliary pipe 23*i*. The fixed portion 23*i*1 and the slide pipe 23*i*2 according to the fifth variation may serve as an auxiliary pipe varying means.

In the state of FIG. 16A, a player plays the wind instrument 10*i* with the octave hole 26*i* being opened. In a register of the preset pitch of the sound hole 25*a*6 or 25*a*7, an even-number mode of resonance is weakened in the pipe structure 20*i*, so that the second-mode resonance frequency becomes significantly higher than twice the first-mode resonance frequency which is commensurate with a register one octave higher than the first-mode resonance frequency. In the state of FIG. 16B, a player depresses the slide pipe 23*i*2 so that the length of an air column resonating inside the auxiliary pipe 23*i* is shortened compared to that shown in FIG. 16A. In this state, the sound-hole distance Lt becomes adequately longer than the length Li of the auxiliary pipe 23*i* so as to intensify an even-number mode of resonance in the pipe structure 20*i*. This makes it possible to produce sound one octave higher than all the registers of the preset pitches of the sound holes 25*a*; hence, the wind instrument 10*i* is able to produce sound with preferable pitches and tone colors. According to this constitution, the wind instrument 10*i* allows players to adjust pitches and tone colors during performance in progress by operating the slide pipe 23*i*2 of the auxiliary pipe 23*i*.

The auxiliary pipe 23*i* of the wind instrument 10*i* can be further equipped with a bypass member (or a bypass pipe), which will be described in a sixth variation. The bypass member is able to switch over whether or not an internal path of the auxiliary pipe 23*i* passes through the bypass pipe. That is, the bypass member changes a pass-through of an air flow so as to change the length of an air column resonating inside the auxiliary pipe 23*i*. This prevents the length of an air column resonating inside the main pipe 22*a* from being shortened than the length of an air column resonating inside the auxiliary pipe 23*i*. Thus, the wind instrument 10*i* is able to produce sound one octave higher than all the registers of the preset pitches of the sound holes 25*a*; hence, it is possible to produce sound with preferable pitches and tone colors.

Alternatively, the wind instrument 10*i* of the fifth variation can be modified to change an internal diameter of the auxiliary pipe 23*i*, thus changing an amplitude of an air column resonating inside the auxiliary pipe 23*i*. As a means of changing an internal diameter, it is possible to employ an inner tube which is engaged inside the auxiliary pipe 23*i* so as to reduce the internal diameter, thus adjusting the tone color of the wind instrument 10*i*.

(6) Sixth Variation

The foregoing embodiments are designed to change pitches by use of sound holes, whereas it is possible to employ bypass members for changing pitches. For instance, it is possible to employ bypass members which are conventionally used in trumpets.

Figure 17:
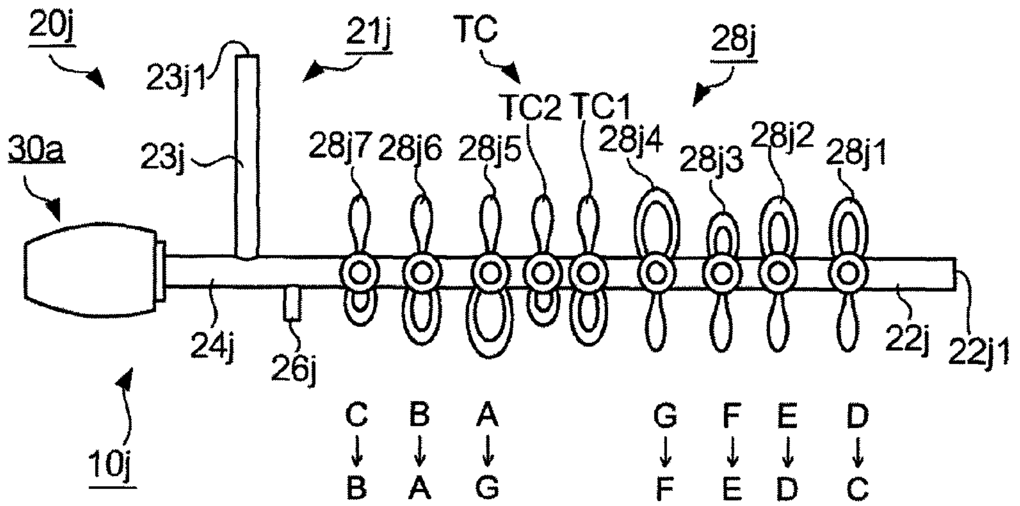
FIG. 17 is a plan view of a wind instrument including a mouthpiece and a pipe structure according to a sixth variation.

FIG. 17 is a plan view of a wind instrument 10*j* according to a sixth variation, wherein parts equivalent to those of the wind instrument 10*a* are designated by the corresponding reference numerals suffixed with "j" instead of "a". The wind instrument 10*j* differs from the wind instrument 10*a* in terms of dimensions and quantity; hence, the following description refers to only the differences between the wind instruments 10*a* and 10*j* while omitting the similarity therebetween. The wind instrument 10*j* is constituted of a pipe structure 20*j* (constituted of straight pipes) and a mouthpiece 30*a*. The pipe structure 20*j* includes a main pipe 22*j*, an auxiliary pipe 23*j* (commensurate with the auxiliary pipe 23*a*) and a blow member 24*j* (commensurate with the blow member 24*a*), all of which are configured of straight pipes. The main pipe 22*j* of the wind instrument 10*j* is longer than the main pipe 22*a* of the wind instrument 10*a*, whist the sectional area of the main pipe 22*j* is smaller than the sectional area of the main pipe 22*a*. That is, the wind instrument 10*j* approximates a tapered wind instrument (having a slender upper base) rather than the wind instrument 10*a*.

The main pipe 22*j* is equipped with seven bypass members 28*j* (i.e. 28*j*1 through 28*j*7). The bypass members 28*j* include bypass pipes having bypass paths which are longer than a main-pipe path corresponding to an internal space of the main pipe 22*j*. In addition, the bypass members 28*j* include bypass keys (which allow players to perform bypass operations) and valves (e.g. rotary valves which are interlocked with bypass operations to switch over paths). Upon an operation of the bypass key, the bypass valve moves (or rotates) to switch a pass-through to the bypass path leading to the main-pipe path. With the bypass members 28*j* being operated, the wind instrument 10*j* changes the length of an air column resonating inside the main pipe 22*j*, thus producing sound with desired pitches. The bypass members 28*j* according to the sixth variation may serve as a pitch adjusting means. When a player operate the bypass member 28*j* so as to switch the main-pipe path and the bypass path during performance in progress, the wind instrument 10*j* varies the wavelength of sound resonating inside a branch pipe 21*j* so as to change pitches. The bypass means 28*j* are set up in connection with the preset pitches which are determined in advance. The main pipe 22*j* of the wind instrument 10*j* is further equipped with trill keys TC, namely a whole-tone trill key TC1 and a semitone trill key TC2. When a player operates the trill key TC while operating any one of the bypass members 28*j*, the wind instrument 10*j* changes sound by a whole tone or a semitone.

In order to secure consistency with fingering operations of conventional wood wind instruments, the wind instrument 10*j* is modified such that the internal space of the main pipe 22*j* can pass through the bypass path when none of the bypass members 28*j* is operated. In this state, when a player operates the bypass member 28*j*, the "bypassed" internal space of the main pipe 22*j* is shortened so as to reduce the length of an air column, thus increasing pitches. Alternatively, the wind instrument 10*j* is modified such that the bypass member 28*j* is installed in the auxiliary pipe 23*j* so as to change the length of an air column resonating inside the auxiliary pipe 23*j* during performance in progress. In this connection, this bypass member 28*j* may serve as an auxiliary pipe varying means.

No sound holes need to be opened during performance of the wind instrument 10*j* adopting the bypass members 28*j* for controlling pitches. Therefore, it is possible to achieve silence performance or mute performance by applying mutes to openings 22*j*1 and 23*j*1. Of course, the foregoing embodiments and variations can adopt mutes. The wind instrument 10*j* of FIG. 17 adopts path switches using rotary valves which are conventionally used in French horns or the like. Instead of these path switches using rotary valves, it is possible to employ other path switches using piston valves which are conventionally used in trumpets or the like.

(7) Seventh Variation

The foregoing embodiments are designed to change pitches by use of sound holes of main pipes. Instead, it is possible to change pitches by use of a straight pipe which slides along a main pipe. For instance, it is possible to employ slide pipes which are conventionally used in trombones or the like.

Figure 18A:
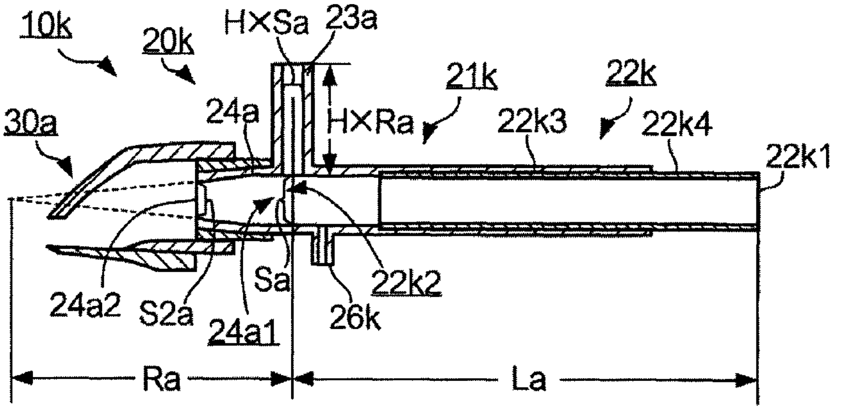
FIG. 18A is a longitudinal sectional view of a wind instrument including a mouthpiece and a pipe structure according to a seventh variation.
Figure 18B:
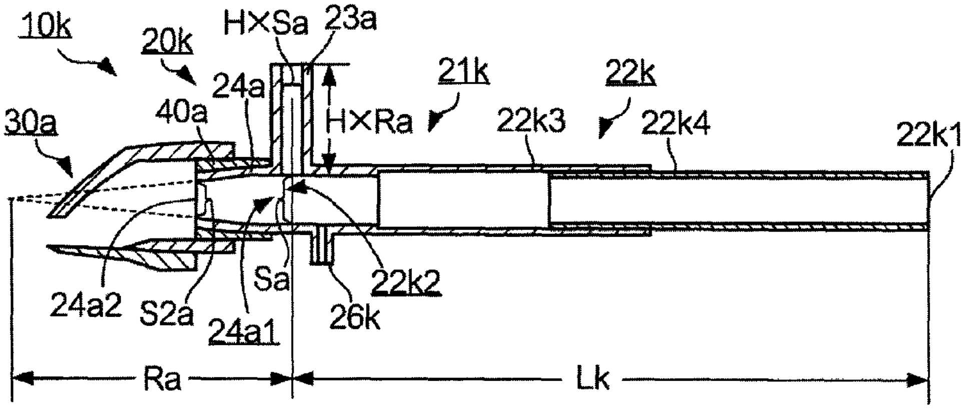
FIG. 18B is a longitudinal sectional view of the wind instrument shown in FIG. 18A, in which a main pipe is increased in length.

FIGS. 18A and 18B illustrate a wind instrument 10*k* having a pipe structure 20*k* according to a seventh variation, wherein parts equivalent to those of the wind instrument 10*a* are designated by the reference numerals suffixed with "k" instead of "a"; hence, a description thereof will be omitted. The pipe structure 20*k* of the wind instrument 10*k* is constituted of the blow member 24*a* and a branch pipe 21*k* including the auxiliary pipe 23*a* and a main pipe 22*k*. The main pipe 22*k* has a fixed portion 2*k*3 which is connected to the auxiliary pipe 23*a* and the blow member 24*a*. The fixed portion 22*k*3 of the main pipe 22*k* is configured of a straight pipe composed of brass or the like. The main pipe 22*k* is equipped with a slide pipe 22*k*4 which is a straight pipe composed of brass or the like. The slide pipe 22*k*4 is inserted into the fixed portion 22*k*3 of the main pipe 22*k* and movable in a certain range of length. The slide pipe 22*k*4 has an opening 22*k*1 which is positioned opposite to the fixed portion 22*k*3. In the pipe structure 20*k*, an octave hole 26*k* is formed in proximity to a hollow joint 22*k*2 of the main pipe 22*k*.

In the state of FIG. 18A, the slide pipe 22*k*4 is disposed at a position indicating a length La of the main pipe 22*k*. In the state of FIG. 18B, the slide pipe 22*k*4 moves horizontally to a position indicating a length Lk of the main pipe 22*k*. According to this constitution, the slide pipe 22*k*4 attached to the fixed portion 22*k*3 changes the overall length of the main pipe 22*k* so as to change the length of an air column resonating inside the main pipe 22*k*, thus producing desired pitches. When a player operates the slide pipe 22*k*4 so as to change the length of the main pipe 22*k* during performance in progress, the wind instrument 10*k* varies the wavelength of sound resonating inside the branch pipe 21*k* so as to vary pitches. The slide pipe 22*k*4 and the fixed portion 22*k*3 of the main pipe 22*k* according to the seventh variation may serve as a pitch adjusting means. Compared to conventional wood wind instruments such as saxophones which are able to change pitches in a discrete manner, the wind instrument 10*k* of the seventh variation can act like trombones to cope with portamento techniques for continuously and smoothly varying pitches.

(8) Eighth Variation

The foregoing embodiments employ linear pipes (e.g. straight pipes) having linear axial directions; but it is possible to employ curved/bent pipes which are partially curved in axial directions. For instance, it is possible to use a single curved/bent pipe as a main pipe, an auxiliary pipe or a blow member. Alternatively, it is possible to use a plurality of curved/bent pipes as a main pipe, an auxiliary pipe and a blow member.

Figure 19:
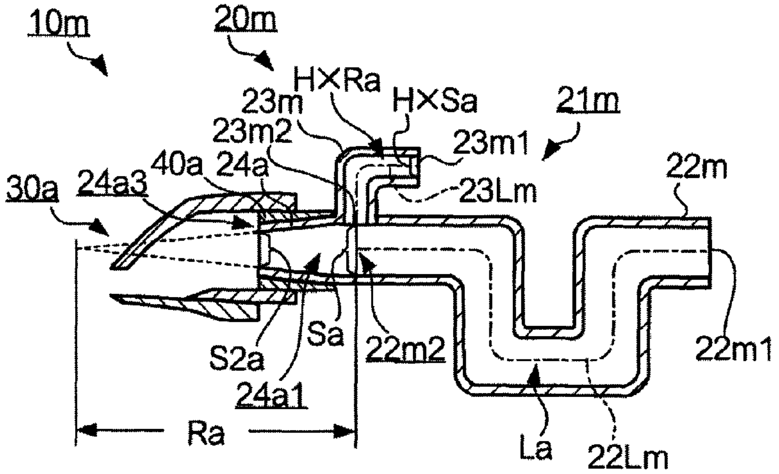
FIG. 19 is a longitudinal sectional view of a wind instrument including a mouthpiece and a pipe structure according to an eighth variation.

FIG. 19 illustrates a wind instrument 10*m* having a pipe structure 20*m* according to an eight variation, wherein parts equivalent to those of the wind instrument 10*a* are designated by the reference numerals suffixed with "m" instead of "a"; hence, a description thereof will be omitted. The pipe structure 20*m* is constituted of a main pipe 22*m* and an auxiliary pipe 23*m* as well as the blow member 24*a*. A branch pipe 21*m* is constituted of the main pipe 22*m* and the auxiliary pipe 23*m*, both of which are curved/bent pipes. An opening 22*m*1 is formed at one end of the main pipe 22*m*, whilst a hollow joint 22*m*2 is formed at the other end. The main pipe 22*m* is connected to the blow member 24*a* with the hollow joint 22*m*2, wherein Sa denotes a sectional area of the hollow joint 22*m*2 which is commensurate with a sectional area of the main pipe 22*m*. The main pipe 22*m* is connected to the auxiliary pipe 23*m* with the side portion of the hollow joint 22*m*2. Herein, La denotes the length of a center line 22Lm (which is partially meandered or curved) connecting between the center of the sectional area of the opening 22*m*1 and the center of the sectional area of the hollow joint 22*m*2.

An opening 23*m*1 is formed at the upper end of the auxiliary pipe 23*m* (which is bend and directed horizontally), whilst a hollow joint 23*m*2 is formed at the lower end of the auxiliary pipe 23*m*. The auxiliary pipe 23*m* is connected to the main pipe 22*m* with the hollow joint 23*m*2. The internal space of the main pipe 22*m* is interconnected with the internal space of the auxiliary pipe 23*m*. That is, the hollow joint 22*m*2 is disposed at a branch point at which the branch pipe 21*m* is branched into the main pipe 22*m* and the auxiliary pipe 23*m*. Herein, H×Ra denotes the length of a center line 23Lm (which is partially bent) of the auxiliary pipe 23*m* connecting between the center of a sectional area of the opening 23*m*1 and the center of a sectional area of the hollow joint 23*m*2; and H×Sa denotes the sectional area of the opening 23*m*1 of the auxiliary pipe 23*m*. The branch pipe 21*m* is connected to the blow member 24*a* such that the hollow joint 22*m*2 is coupled with the hollow joint 24*a*1. According to this constitution, the wind instrument 10*m* is designed in a compact size but is able to reproduce pitches and tone colors of the wind instrument 100*a* shown in FIG. 4.

(9) Ninth Variation

The foregoing embodiments and variations are designed such that auxiliary pipes are connected to the side walls of main pipes, but it is possible to juxtapose openings of main pipes (disposed close to mouthpieces) and openings of auxiliary pipes. In this case, main pipes and auxiliary pipes are not necessarily formed in cylindrical shapes.

Figure 3B:
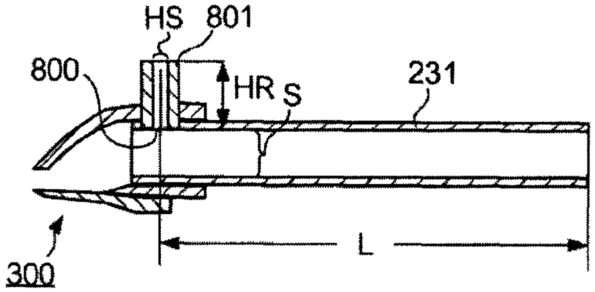
FIG. 3B is a longitudinal sectional view showing another example of a wind instrument using a straight pipe together with a mouthpiece.

The foregoing wind instrument as shown in FIG. 3B, in which an auxiliary pipe is branched inside a mouthpiece, is designed to approximate the original wind instrument 200 shown in FIG. 3A such that the sectional area S of the blow-input portion (i.e. the upper base area of the conical pipe 204) is approximately equal to the sectional area S of the main pipe (i.e. the straight pipe 231); hence, the sum of the sectional area S of the main pipe and the sectional area HS of the auxiliary pipe (i.e. the attachment 801) becomes larger than the sectional area S of the blow-input portion, so that a blowing resistance of the approximate wind instrument of FIG. 3B is smaller than that of the original wind instrument of FIG. 3A. Such a small blowing resistance may disturb a player's long-horn operation for continuing his/her breath to sustain sound, wherein a player may experience difficulty to continuously blowing his/her breaths. A ninth variation is designed to solve this drawback.

Figure 20A:
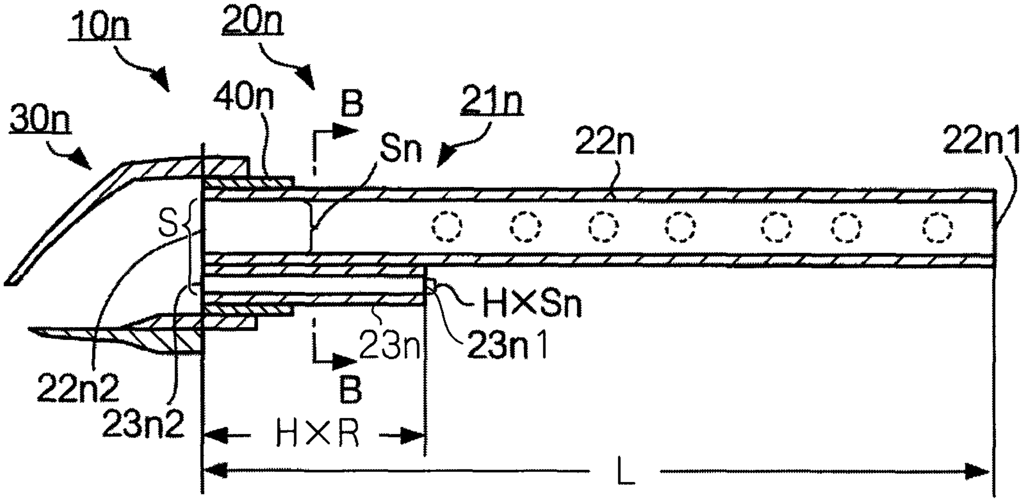
FIG. 20A is a longitudinal sectional view of a wind instrument including a mouthpiece and a pipe structure according to a ninth variation.
Figure 20B:
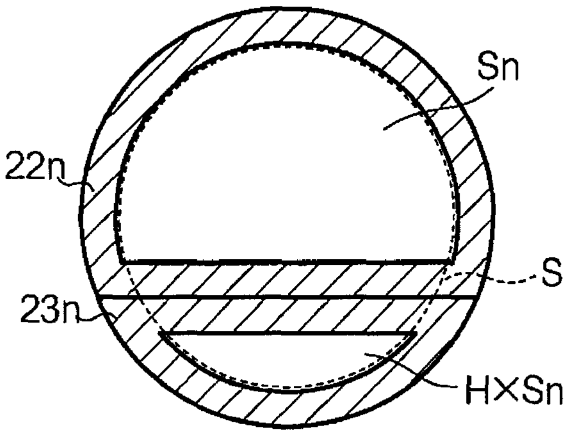
FIG. 20B is a cross-sectional view showing a circular shape in which a main pipe and an auxiliary pipe juxtapose with each other.

FIGS. 20A and 20B illustrate a wind instrument 10*n* having a pipe structure 20*n* according to the ninth variation. FIG. 20A is a longitudinal sectional view of the wind instrument 10*n*. The wind instrument 10*n* is constituted of a mouthpiece 30*n* and the pipe structure 20*n* (including two cylindrical pipes connected together). The pipe structure 20*n* is composed of a metal such as brass. The pipe structure 20*n* is constituted of a main pipe 22*n* and an auxiliary pipe 23*n*. The main pipe 22*n* is a cylindrical pipe with a length L and a sectional area Sn, whilst the auxiliary pipe 23*n* is a cylindrical pipe with a length H×R and a sectional area H×Sn. Openings 22*n*1 and 22*n*2 are formed at the opposite ends of the main pipe 22*n* in the length direction. Openings 23*n*1 and 23*n*2 are formed at the opposite ends of the auxiliary pipe 23*n* in the length direction. The openings 22*n*2 and 23*n*2 juxtapose in the same vertical plane so that they are collectively directed to the mouthpiece 30*n*. The main pipe 22*n* and the auxiliary pipe 23*n* are collectively inserted into the mouthpiece 30*n* via a cork member 40*n*.

FIG. 20B is a cross-sectional view taken along line B-B in FIG. 20A. As shown in FIG. 20B, the sectional areas of the main pipe 22*n* and the auxiliary pipe 23*n* serve as constituent parts of a circular shape so that the total of these sectional areas is approximately equal to the circular shape having the sectional area S. According to this constitution, the wind instrument 10*n* approximates an imaginable tapered pipe with a sectional area S at the upper base and a length R ranging from the upper base to the vertex. Since the sum of the sectional area Sn of the main pipe 22*n* and the sectional area H×Sn of the auxiliary pipe 23*n* is approximately equal to the sectional area S of the blow-input portion (i.e. the upper base area of the conical pipe 204) of the original wind instrument 200 shown in FIG. 3A, the wind instrument 10*n* of the ninth variation is able to demonstrate a good blowing sensation comparable to acoustic instruments in addition to the effects of the foregoing embodiments.

The wind instrument 10*n* is not bulky in shape but has an adequate capacity since the main pipe 22*n* juxtapose with the auxiliary pipe 23*n*. In order to form a seamless circular shape by juxtaposing the main pipe 22*n* and the auxiliary pipe 23*n*, it is possible to fill gaps, which may be formed between them, with filing materials such as corks and rubbers, thus preventing a player's breath from escaping from gaps.

The wind instrument 10*n* is designed such that the sum of the sectional area Sn of the main pipe 22*n* and the sectional area H×Sn of the auxiliary pipe 23*n* is approximately equal to the sectional area S of the blow-input portion (i.e. the upper base area of the conical pipe 204) of the original wind instrument 200 shown in FIG. 3A; but this is not a restriction. In order to adjust a blowing sensation, it is possible to reduce the sum of the sectional areas Sn and H×Sn to a smaller value than the sectional area S of the blow-input portion of the original wind instrument 200 of FIG. 3A.

(10) Tenth Variation

In the foregoing embodiments, an opening is formed at one end of a main pipe of a wind instrument, but it is possible to attach a pipe member having a specific taper ratio, such as a bell and a tapered pipe, at one end of a main pipe instead of the opening. In the wind instrument 10*a*, for example, it is possible to additionally attach a bell to the terminal end of the main pipe 22*a* opposite to the blow member 24*a*. In this case, the volume of sound is increased by the operation of a bell. Instead of a bell, it is possible to attach a tapered pipe, whose tip end is reduced in size, to the terminal end of the main pipe 22*a*. According to this constitution in which a main pipe is connected to a pipe member, it is possible to change the volume of sound output from the branch pipe 21*a*.

Figure 21A:
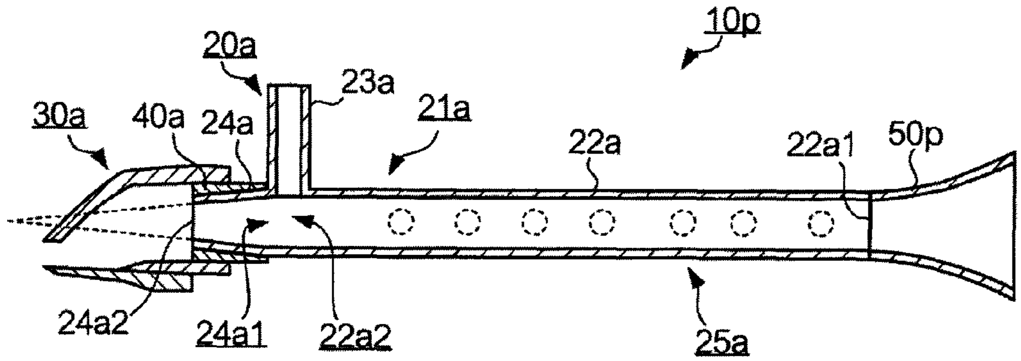
FIG. 21A is a longitudinal sectional view of a wind instrument including a mouthpiece and a pipe structure according to a tenth variation, wherein the pipe structure is connected to a bell.
Figure 21B:
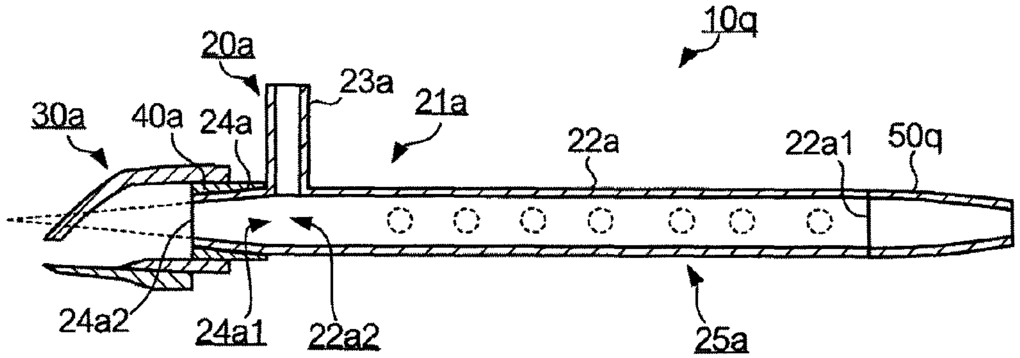
FIG. 21B is a longitudinal sectional view of the wind instrument shown in FIG. 21A, wherein the pipe structure is connected to a tapered pipe.

FIGS. 21A and 21B illustrate wind instruments adopting pipe members according to a tenth variation, wherein parts identical to those of the wind instrument 10*a* are designated by the same reference numerals; hence, the description thereof will be omitted. FIG. 21A is a longitudinal sectional view of a wind instrument 10*p* adopting a bell 50*p*. Specifically, the wind instrument 10*p* is constituted of the pipe structure 20*a*, the mouthpiece 30*a*, the cork member 40*a* and the bell 50*p*. The bell 50*p* is a tapered pipe member, composed of a plastic or a metal such as brass, whose taper ratio is continuously varied. The bell 50*p* is connected to the pipe structure 20*a* such that the small opening area thereof is coupled with the opening 22*a*1 of the main pipe 22*a*. According to this structure, sound resonating inside the pipe structure 20*a* is amplified and transmitted into the external space.

FIG. 21B is a longitudinal sectional view of a wind instrument 10*q* adopting a tapered pipe 50*q*. Specifically, the wind instrument 10*q* is constituted of the pipe structure 20*a*, the mouthpiece 30*a*, the cork member 40*a* and the tapered pipe 50*q*. The tapered pipe 50*q* is a tapered pipe member, composed of a plastic or a metal such as brass, whose taper ratio is continuously varied. The tapered pipe 50*q* is connected to the pipe structure 20*a* such that the large sectional area thereof is coupled with the opening 22*a*1 of the main pipe 22*a*. According to this constitution, sound resonating inside the pipe structure 20*a* is attenuated and transmitted into the external space.

(11) Eleventh Variation

Figure 1A:
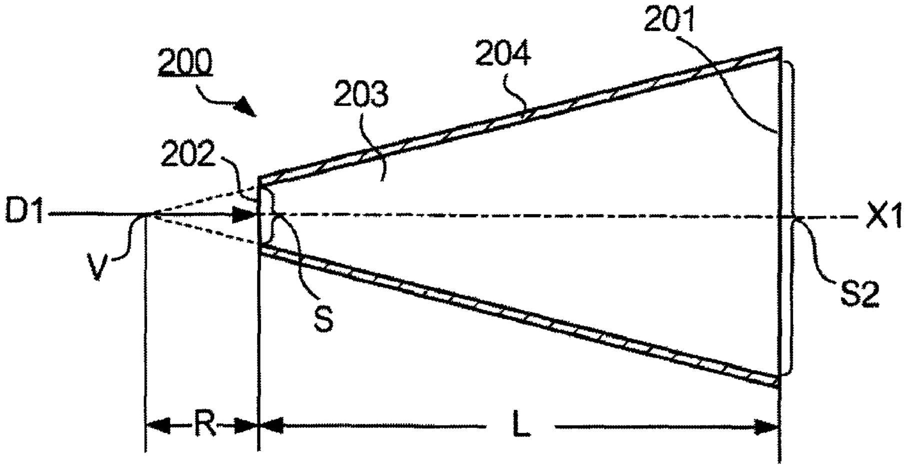
FIG. 1A is a longitudinal sectional view of a resonance pipe having a conical surface.
Figure 1B:
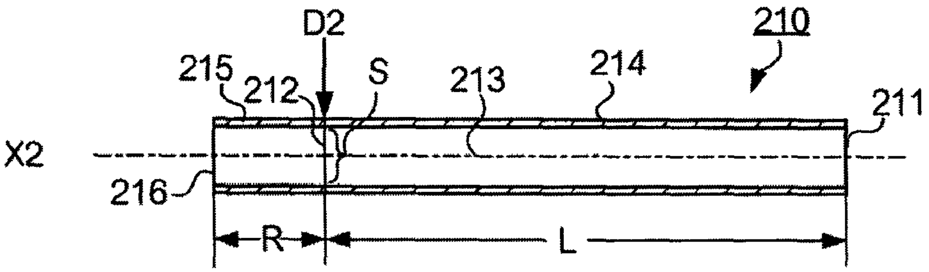
FIG. 1B is a longitudinal sectional view of a pipe unit having a joint structure constituted of two straight pipes both having the same sectional area.
Figure 1C:
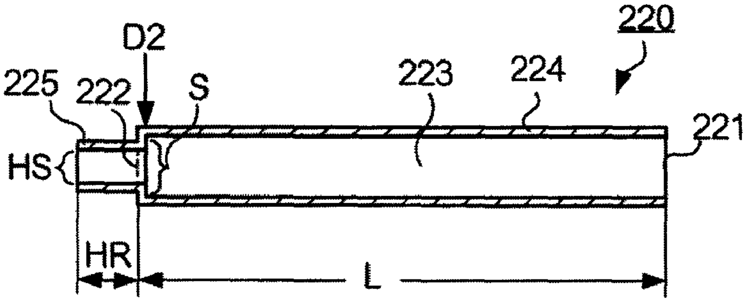
FIG. 1C is a longitudinal sectional view of a pipe unit having a joint structure constituted of two straight pipes having different sectional areas.
Figure 2:
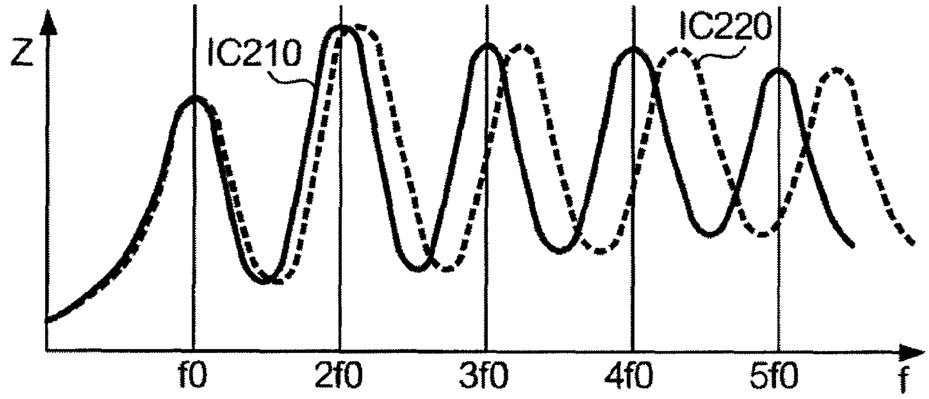
FIG. 2 is a graph showing impedance curves representing the properties of pipe units shown in FIGS. 1B and 1C.

In the foregoing embodiments, an auxiliary pipe is connected to the side surface of a main pipe whilst a blow member is connected to a hollow joint opposite to the opening of a main pipe, but it is possible to reverse the positional relationship between the auxiliary pipe and the blow member in connection with the main pipe. In this case, the positional relationship between the main pipe and the auxiliary pipe is similar to that of the pipe unit 220 shown in FIG. 1C.

Figure 22:
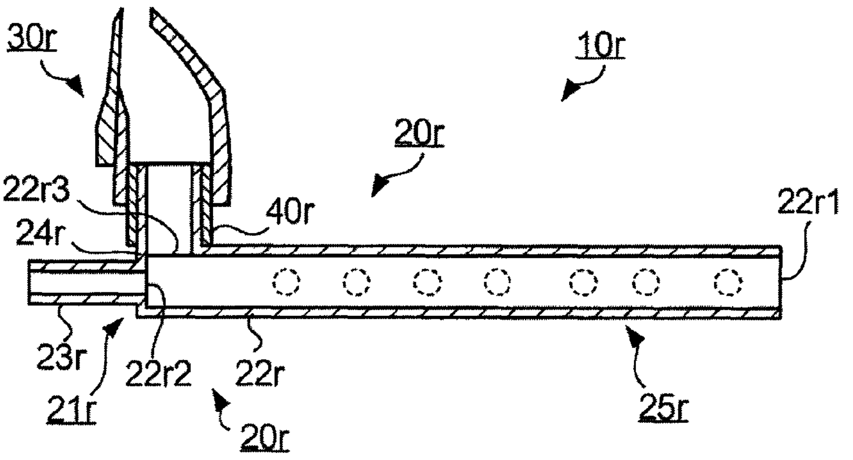
FIG. 22 is a longitudinal sectional view of a wind instrument including a mouthpiece and a pipe structure according to an eleventh variation.

FIG. 22 illustrates a wind instrument 10*r* having a pipe structure 20*r* according to an eleventh variation, wherein parts equivalent to those of the wind instrument 10*a* are designated by the reference numerals suffixed with "r" instead of "a"; hence, a description thereof will be omitted. FIG. 22 is a longitudinal sectional view of the wind instrument 10*r*, which is constituted of the pipe structure 20*r*, a mouthpiece 30*r* (corresponding to the mouthpiece 30*a*) and a cork member 40*r*. The pipe structure 20*r* is constituted of a main pipe 22*r* (corresponding to the main pipe 22*a*), an auxiliary pipe 23*r* (corresponding to the auxiliary pipe 23*a*) and a blow member 24*r* (which is configured of a straight pipe).

The main pipe 22*r* has an opening 22*r*1 and a hollow joint 22*r*2 at opposite ends thereof, wherein the auxiliary pipe 23*r* is coupled with the hollow joint 22*r*2. The blow member 24*r* is connected to the side surface of the main pipe 22*r* with a hollow joint 22*r*3. The hollow joint 22*r*2 is disposed at a branch point at which a branch pipe 21*r* is branched into the main pipe 22*r* and the auxiliary pipe 23*r*. The connected position of the blow member 24*r* is commensurate with the foregoing position designated by the arrow D2 in FIG. 1C. According to this structure, the wind instrument 10*r* approximates an imaginary wind instrument including a tapered pipe whose property is realized by the sectional area of the main pipe 22*r*, the sectional area and length of the auxiliary pipe 23*r*.

(12) Twelfth Variation

In the second, third and fourth embodiments, a mouthpiece is detachably attached to a blow member, but it is possible to fix the mouthpiece to the blow member. For instance, a mouthpiece can be fixed to a detachable-connect portion of a blow member via the adhesive. Alternatively, a mouthpiece can be integrally formed together with a blow member.

(13) Thirteenth Variation

The foregoing embodiments are designed to use straight pipes having circular sectional areas, but it is possible to use other types of straight pipes having elliptical sectional shapes or polygonal sectional shapes, wherein these straight pipes are not varied in sectional shapes and sectional areas.

(14) Fourteenth Variation

The foregoing embodiments are designed to use tapered pipes having circular sectional areas, but it is possible to use other types of tapered pipes having elliptical sectional shapes or polygonal sectional shapes, wherein the openings formed at the opposite ends of tapered pipes have similar shapes but the hollow portions of tapered pipes are varied in areas.

(15) Fifteenth Variation

The foregoing embodiments are designed such that main pipes are longer than auxiliary pipes; but this is not a restriction. Both the main pipes and auxiliary pipes may have the same lengths. Alternatively, auxiliary pipes can be longer than main pipes.

(16) Sixteenth Variation

The foregoing embodiments are designed such that branch pipes are constituted of main pipes and auxiliary pipes both of which are configured of straight pipes; but this is not a restriction. One of or both of main pipes and auxiliary pipes can be configured of tapered pipes. In this case, wind instruments are affected by tapered shapes of main/auxiliary pipes so that standing waves occurring inside branch pipes are varied; hence, those wind instruments employing tapered pipes must differ from wind instruments using straight pipes alone in terms of tone colors and pitches.

(17) Seventeenth Variation

In the second embodiment, the wind instrument **10*b* does not vary the length of an air column resonating inside the blow member 24*b*, but it is possible to vary the length of an air column resonating inside the blow member 24*b*** by use of a sound hole. In the open state of a sound hole formed in a blow member, an air column of a branch pipe does not resonate. Compared to the closed state of a sound hole of a blow instrument, sound should be significantly varied in tone color and pitch when the sound hole of the blow member is opened. This sound hole formed in a blow member may serve as a pitch adjusting means.

Figure 23:
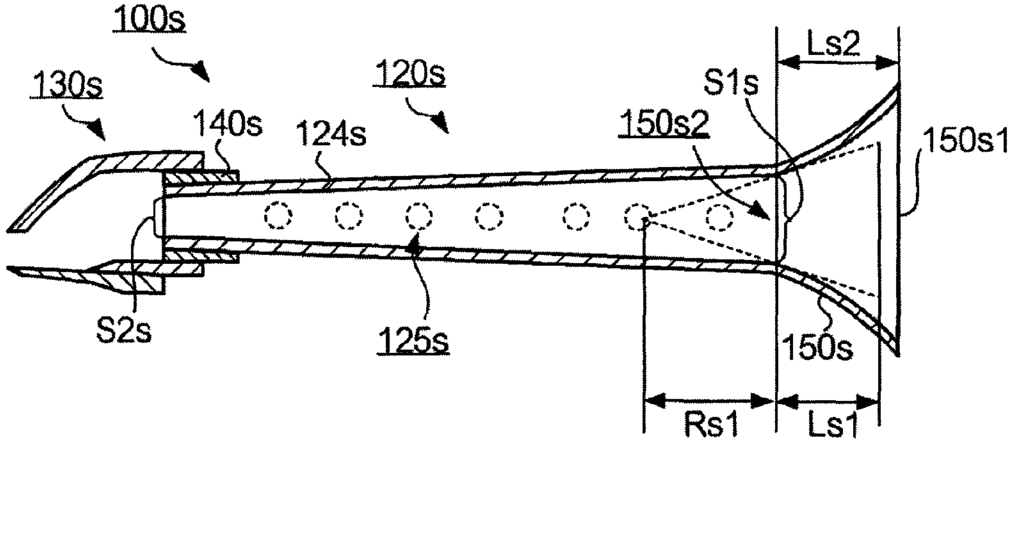
FIG. 23 is a longitudinal sectional view of a wind instrument including a mouthpiece, a pipe structure and a bell.

FIG. 23 illustrates a wind instrument **100*s* (which serves as a basis of a seventeen variation), which is constituted of a pipe structure 120*s* and a mouthpiece 130*s*. The pipe structure 120*s* is constituted of a tapered pipe 124*s* and a bell 150*s*. The tapered pipe 124*s* has a tapered shape having upper and lower bases, wherein S2***s* denotes a sectional area of the upper base, and S1*s* denotes a sectional area of the lower base. The mouthpiece **130*s* is attached to the upper base of the tapered pipe 124*s*. A plurality of sound holes 125*s* is formed on the side surface of the tapered pipe 124*s*. An opening 150*s*1 is formed at one end of the bell 150*s*, whilst a hollow joint 150*s*2 is formed at the other end. Herein, Ls2 denotes a distance between the opening 150*s*1 and the hollow joint 150*s*2. The bell 150*s* is connected to the tapered pipe 124*s* with the hollow joint 150*s*2. The bell 150*s* approximates an imaginary tapered pipe in which S1***s* denotes the sectional area of the upper base, Ls1 denotes the length, and Rs1 denotes the distance between the upper base to the vertex.

Figure 24:
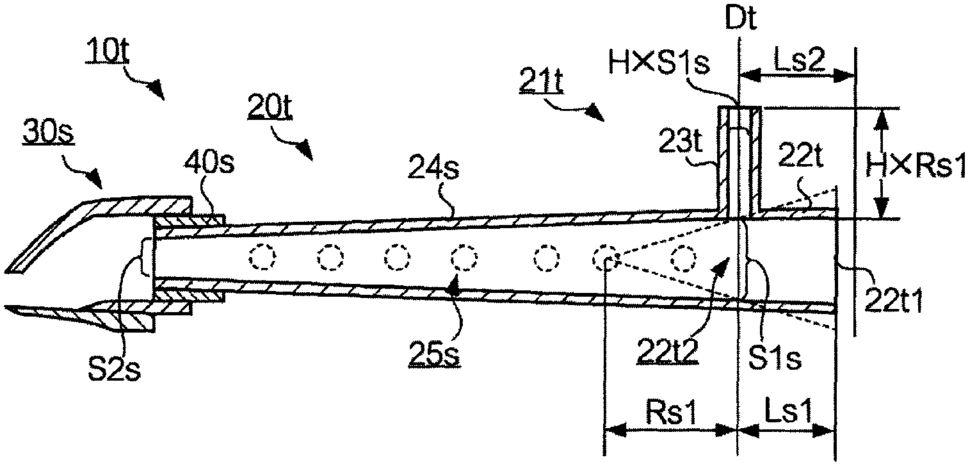
FIG. 24 is a longitudinal sectional view of a wind instrument including a mouthpiece and a pipe structure according to a seventeenth variation, which is commensurate with the wind instrument shown in FIG. 23.

FIG. 24 illustrates a wind instrument **10*t* according to a seventeenth variation, wherein parts equivalent to those of the wind instrument 100*s* are designated by the two-digit reference numerals precluding hundredth places. A pipe structure 20*t* is constituted of a main pipe 22*t*, an auxiliary pipe 23*t* and a blow member 24*s*. The blow member 24*s* has the same constitution as the tapered pipe 124*s* of the wind instrument 100*s*. A branch pipe 21*t* is constituted of the main pine 22*t* and the auxiliary pipe 23*t*, which are configured of straight pipes. An opening 22*t*1 is formed at one end of the main pipe 22*t*, whilst a hollow joint 22*t*2 is formed at the other end. The main pipe 22*t*, the auxiliary pipe 23*t* and the blow member 24*s* are placed in the same positional relationship as the main pipe 22*a*, the auxiliary pipe 23*a* and the blow member 24*a* in the pipe structure 20*a* of the wind instrument 10*a***.

Ls1 denotes a distance ranging from the opening **22*t*1 of the main pipe 22*t* to a center line Dt of the auxiliary pipe 23*t*. When the auxiliary pipe 23*t* is designed with a length H×Rs1 and a sectional area H×S1***s*, the branch pipe **21*t* approximates an imaginary tapered pipe in which Rs1 denotes a distance ranging from the upper base to the vertex, S1***s* designates the sectional area of the upper base, and Ls1 denotes the length ranging from the upper base to the lower base, wherein H denotes a positive constant in Equation (6). That is, the branch pipe **21*t* approximates the bell 150*s*. For this reason, the wind instrument 10*t* approximates the wind instrument 100*s*** in terms of tone colors and pitches.

(18) Eighteenth Variation

In the second embodiment, the wind instrument **10*b* does not vary the length of an air column resonating inside the blow member 24*b*, but it is possible to vary the length of an air column resonating inside the blow member 24*b*** by way of a bypass pipe. A bypass pipe attached to a blow member varies the distance from a mouthpiece to a main pipe or an auxiliary pipe so as to vary a blowing sensation imparted to player's lips, thus varying tone pitches. Such a bypass pipe attached to a blow member may serve as a pitch adjusting means.

Figure 25:
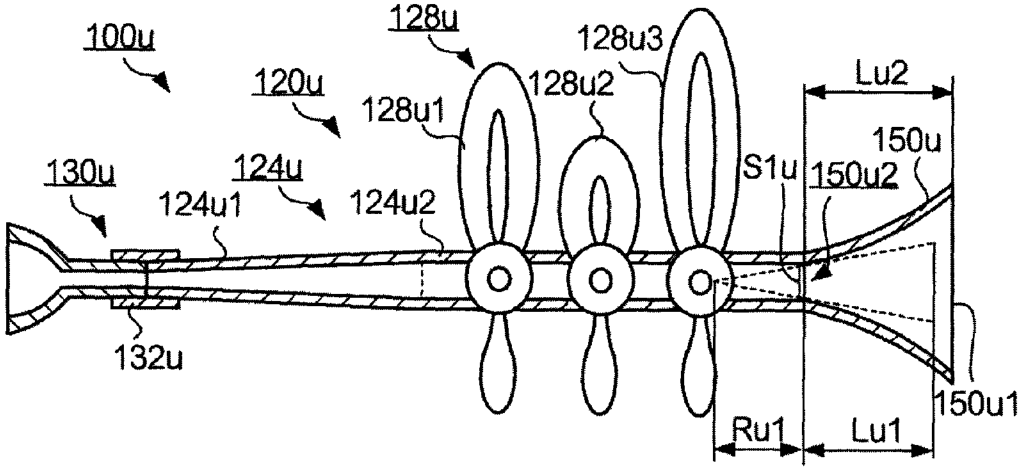
FIG. 25 is a longitudinal sectional view of a wind instrument including a mouthpiece, a bell and a pipe structure equipped with bypass members.

FIG. 25 illustrates a wind instrument **100*u* (which serves as the basis of an eighteenth variation), which is constituted of a pipe structure 120*u*, a mouthpiece 130*u* and a mouthpiece attachment 132*u*. The pipe structure 120*u* is constituted of a tapered pipe 124*u*1, a straight pipe 124*u*2 and a bell 150*u*. The mouthpiece 130*u* is attached to the pipe structure 120*u* via the mouthpiece attachment 132*u*. A blow member 124*u* is constituted of the tapered pipe 124*u*1 and the straight pipe 124*u*2. The mouthpiece 130*u* is attached to the upper base of the tapered pipe 124*u*1. The straight pipe 124*u*2 is equipped with bypass members 128*u* (namely, bypass members 128*u*1, 128*u*2 and 128*u*3). The bypass members 128*u* are used to form bypass paths which elongate a straight-pipe path formed inside the straight pipe 124*u*2. The bypass members 128*u* include bypass keys (allowing players to perform bypass operations) and valves (switching paths interlocked with bypass operations). Upon being operated, bypass keys move (or rotate) valves (i.e. rotary valves) so as to switch over pass-through to bypass paths interconnected with the straight-pipe path. That is, the bypass members 128*u* are used to change the length of an air column resonating inside the straight pipe 124*u*2**, thus producing desired pitches.

An opening **150*u*1 is formed at one end of the bell 150*u*, whilst a hollow joint 150*u*2 is formed at the other end. Herein, Lu2 denotes the distance between the opening 150*u*1 and the hollow joint 152*u*2. The bell 150*u* is connected to the straight pipe 124*u*2 with the hollow joint 150*u*2. The bell 150*u* approximate an imaginary tapered pipe in which S1***u* denotes the sectional area of the upper base, Lu1 denotes the length, and Ru1 denotes the distance ranging from the upper base to the vertex.

Figure 26:
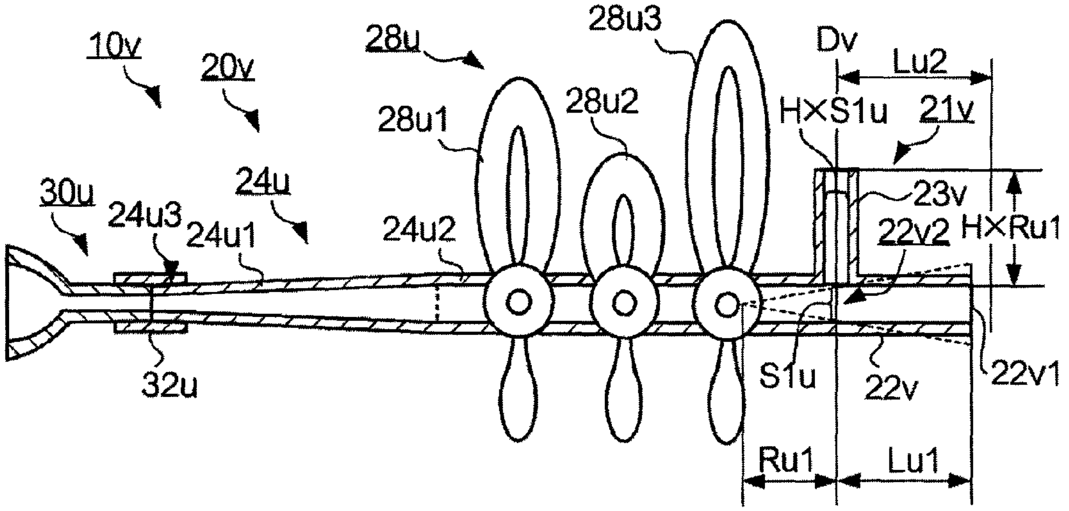
FIG. 26 is a longitudinal sectional view of a wind instrument including a mouthpiece and a pipe structure according to an eighteenth variation, which is commensurate with the wind instrument shown in FIG. 25.

FIG. 26 is a longitudinal sectional view of a wind instrument **10*v* having a pipe structure 20*v* according to an eighteenth variation, wherein parts identical to those of the wind instrument 100*u* are designated by two-digit reference numerals precluding hundredth places from three-digit reference numerals shown in FIG. 25; hence, a description thereof will be omitted. The pipe structure 20*v* is constituted of a main pipe 22*v*, an auxiliary pipe 23*v* and a blow member 24*u*. The blow member 24*u* has the same constitution as the blow member 124*u* of the wind instrument 100*u*. A branch pipe 21*v* is constituted of the main pipe 22*v* and the auxiliary pipe 23*v*, which are configured of straight pipes. An opening 22*v*1 is formed at one end of the main pipe 22*v*, whilst a hollow joint 22*v*2 is formed at the other end. Herein, the main pipe 22*v*, the auxiliary pipe 23*v* and the blow member 24*u* are placed in the same positional relationship as the main pipe 22*a*, the auxiliary pipe 23*a* and the blow member 24*a* in the pipe structure 20*a* of the wind instrument 10*a***.

Lu1 denotes the distance from the opening 22*v*1 of the main pipe 22*v* to a center line Dv of the auxiliary pipe 23*v*. When the auxiliary pipe 23*v* is designed with a length H×Ru1 and a sectional area H×S1*u*, the branch pipe 21*v* approximates an imaginary tapered pipe in which Ru1 denotes the distance from the upper base to the vertex, S1*u* denotes the sectional area of the upper base, and Lu1 denotes the length between the upper base and the lower base, wherein H denotes a positive constant in Equation (6). That is, the branch pipe 21*v* approximates the bell 150*s*. For this reason, tones color and pitches of the wind instrument are approximate to those of the wind instrument 100*s*. In FIGS. 25 and 26, the bypass members 28*u* use rotary valves (which are conventionally used in French horns) as switches, but it is possible to use piston valves (which are conventionally used in trumpets).

(19) Nineteenth Variation

In the second embodiment, the wind instrument 10*b* does not vary the length of an air column resonating inside the blow member 24*b*, but it is possible to vary the length of an air column resonating inside the blow member 24*b* by use of a slide pipe attached to the blow member 24*b*. A slide pipe attached to a blow member varies the distance between a mouthpiece and an auxiliary pipe so as to vary a blowing sensation imparted to player's lips, thus varying pitches. Such a slide pipe attached to a blow member may serve as a pitch adjusting means.

(20) Twentieth Variation

In the seventeenth, eighteenth and nineteenth variations, a pitch adjusting means is attached to the blow member, but it is possible to attach a pitch adjusting means to both the main pipe and the blow member. In this case, different pitch adjusting means (having different configurations selected from among sound holes, bypass members and slide pipes) can be applied to each of the main pipe and the blow member.

(21) Twenty-First Variation

In the ninth variation, the wind instrument 10*n* is designed such that the main pipe 22*n* and the auxiliary pipe 23*n* vertically juxtapose with the openings 22*n*2 and 23*n*2 in proximity to the mouthpiece 30*n*, but it is possible to combine the main pipe 22*n* and the auxiliary pipe 23*n* in a concentric manner.

Figure 27A:
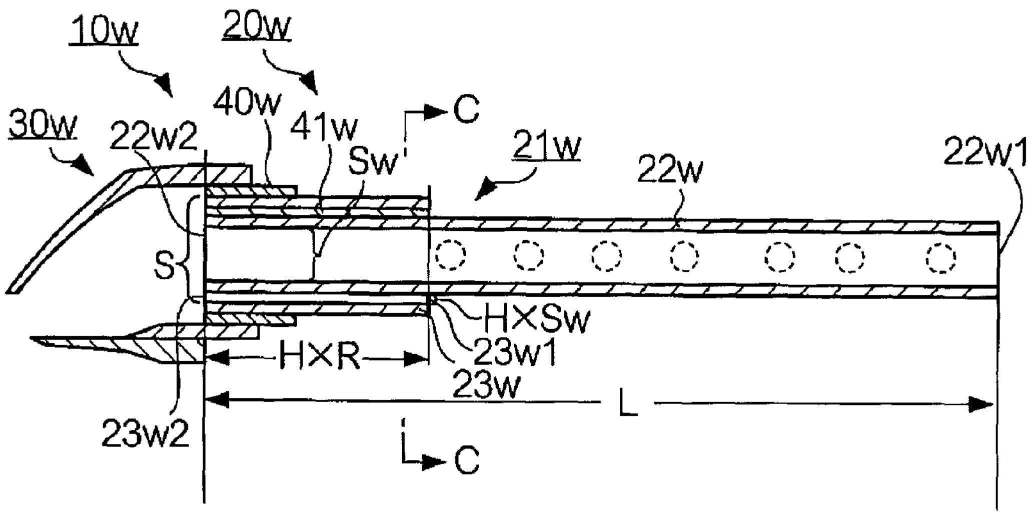
FIG. 27A is a longitudinal sectional view of a wind instrument including a mouthpiece and a pipe structure according to a twenty-first variation.
Figure 27B:
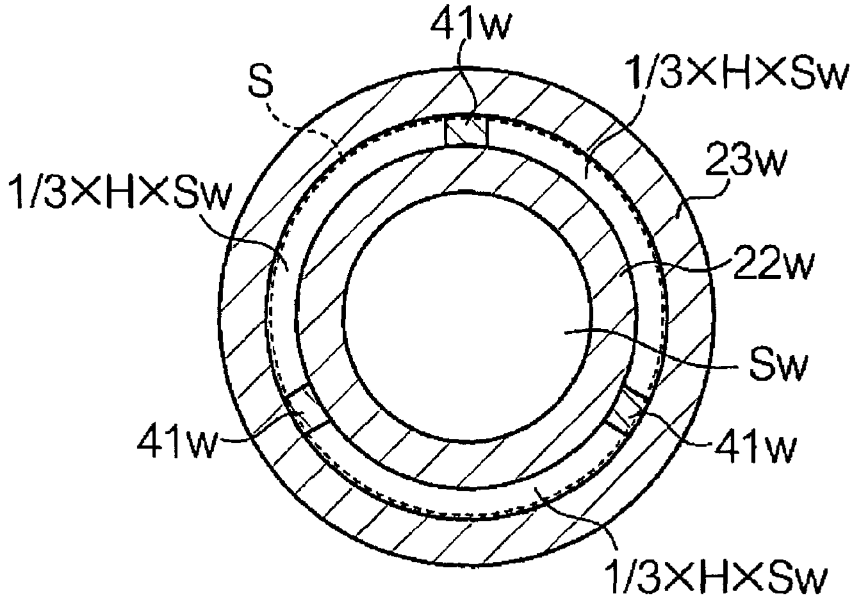
FIG. 27B is a cross-sectional view of the wind instrument taken along line C-C in FIG. 27A.

FIGS. 27A and 27B illustrate a wind instrument 10*w* having a pipe structure 20*w* according to a twenty-first variation. FIG. 27A is a longitudinal sectional view of the wind instrument 10*w* in which a mouthpiece 30*w* is attached to the pipe structure 20*w*, which is constituted of a main pipe 22*w* and an auxiliary pipe 23*w*. The main pipe 22*w* is installed inside the auxiliary pipe 23*w* having a cylindrical shape. The pipe structure 20*w* is composed of a metal such as a brass. The pipe structure 20*w* has a concentric cylindrical shape combining the main pipe 22*w* and the auxiliary pipe 23*w*. The main pipe 22*w* is a cylindrical pipe with a length L and a sectional area Sw, whilst the auxiliary pipe 23*w* is a cylindrical shape with a length H×R and a sectional area H×Sw.

Openings 22*w*1 and 22*w*2 are formed at the opposite ends of the main pipe 22*w* in the length direction, whilst openings 23*w*1 and 23*w*2 are formed at the opposite ends of the auxiliary pipe 23*w* in the length direction. The openings 22*w*2 and 23*w*2 are placed in the same plane in connection with the mouthpiece 30*w*. The mouthpiece 30*w* is connected to the auxiliary pipe 23*w* via a cork member 40*w*. The auxiliary pipe 23*w* is interconnected with the main pipe 22*w* via supports 41*w*.

FIG. 27B is a cross-sectional view taken along line C-C in FIG. 27A. The internal space of the main pipe 22*w* is surrounded by the internal wall of the main pipe 22*w*, wherein it has the sectional area Sw. The internal space of the auxiliary pipe 23*w* is surrounded by the internal wall of the auxiliary pipe 23*w*, the external wall of the main pipe 22*w* and the side walls of the supports 41*w*, wherein it has the sectional area of H×Sw. In the twenty-first variation as shown in FIG. 27B, the internal space of the auxiliary pipe 23*w* is partitioned into three divisions by means of three supports 41*w*, wherein each division has a sectional area of ⅓×H×Sw. That is, the internal space of the main pipe 22*w* and the internal space of the auxiliary pipe 23*w* constitute parts of a circular shape in a cross section, wherein the total of those internal spaces is approximately equal to the sectional area S of a circular shape (i.e. an interior-wall shape of the auxiliary pipe 23*w*). According to this constitution, the pipe structure 20*w* approximates an imaginary tapered pipe in which S denotes the sectional area of the upper base, and R denotes the length between the upper base and the vertex.

Figure 31:
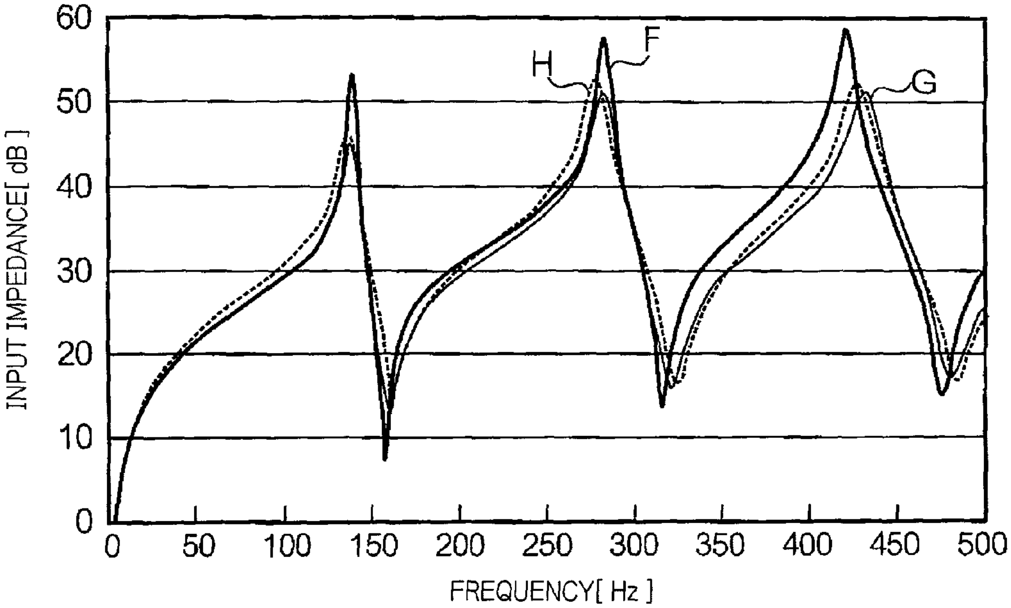
FIG. 31 is a graph showing acoustic characteristics of the wind instrument of the twenty-first variation shown in FIGS. 27A and 27B in comparison with other wind instruments.

FIG. 31 illustrates acoustic characteristics with regard to the wind instrument 10*w* of the twenty-first variation. In FIG. 31, F denotes an input impedance curve of the wind instrument 100*a* of FIG. 4 in which the mouthpiece 130*a* is connected to a conical pipe (i.e. the pipe unit 120*a*); G denotes an input impedance curve of the wind instrument 100*a* of FIG. 4 approximating the structure of FIG. 3B in which the auxiliary pipe (i.e. the attachment 801) is branched inside the mouthpiece 300 while the sectional area S of the main pipe (i.e. the straight pipe 231) is equal to the sectional area Sa2 on the upper base of the conical pipe (i.e. the pipe unit 120*a*) shown in FIG. 4 and in which all the sound holes (not shown) are closed; and H denotes an input impedance curve of the wind instrument 10*w* of the twenty-first variation in which the sum of the internal space of the main pipe 22*w* and the internal space of the auxiliary pipe 23*w*, i.e. Sw+H×Sw, is approximately equal to the sectional area S2*a* of the upper base of the conical pipe (i.e. the pipe unit 120*a*) shown in FIG. 4 and in which all the sound holes are closed.

Compared with the conventional branch-type wind instrument (having the input impedance curve G) as shown in FIG. 3B in which the auxiliary pipe is branched inside the mouthpiece and in which the sectional area S of the main pipe (i.e. the straight pipe 231) is equal to the sectional area S2*a* of the upper base of the conical pipe (i.e. the pipe unit 120*a*) shown in FIG. 4, the input impedance curve H of the twenty-first variation is close to the input impedance curve F of the original wind instrument 100*a* of FIG. 4 particularly in terms of the peak value of a low frequency component, proving that the twenty-first variation achieves good acoustic characteristics.

Since the sum of the sectional area Sw of the main pipe 22*w* and the sectional area H×Sw of the auxiliary pipe 23*w* is approximately equal to the sectional area S of the blow-input portion of the original wind instrument 200 (i.e. the upper base area of the conical pipe 204) shown in FIG. 3A, the twenty-first variation is advantageous over other embodiments/variations and is able to achieve a good blowing sensation comparable to conventional acoustic instruments in addition to the same effects as the foregoing embodiments/variations.

Since the auxiliary pipe 23*w* is disposed along and outside the main pipe 22*w*, the wind instrument 10*w* is not bulky in size but achieves a high capacity.

Although the wind instrument 10*w* is designed such that the sum of the sectional area Sw of the main pipe 22*w* and the sectional area H×Sw of the auxiliary pipe 23*w* is approximate to the sectional area S of the blow-input portion (i.e. the upper base area of the conical pipe 204) of the original wind instrument 200 shown in FIG. 3A, it is possible to modify the wind instrument 10*w* such that the sum of the sectional areas Sw and H×Sw is smaller than the sectional area S of the blow-input portion of the original wind instrument 200 in order to adjust a blowing sensation.

(22) Twenty-Second Variation

In the first embodiment of FIGS. 6A and 6B, the wind instrument 10*a* is designed such that the sectional area of the main pipe 22*a* is equal to the sectional area of the blow member 24*a*, so that the sum of the sectional area Sa of the main pipe 22*a* and the sectional area H×Sa of the auxiliary pipe 23*a* becomes larger than the sectional area Sa at the terminal end of the blow member 24*a*. Compared with the wind instrument of FIG. 3B in which the auxiliary pipe is branched inside the mouthpiece, the wind instrument 10*a* demonstrates a good blowing resistance, which is lower than that of the wind instrument 100*a* of FIG. 4. Such a low blowing resistance may cause a player to experience a difficulty in sustaining his/her breath which needs to be continuously applied to the wind instrument 10*a* in a long-horn technique. A twenty-second variation is designed to solve this drawback.

Figure 28A:
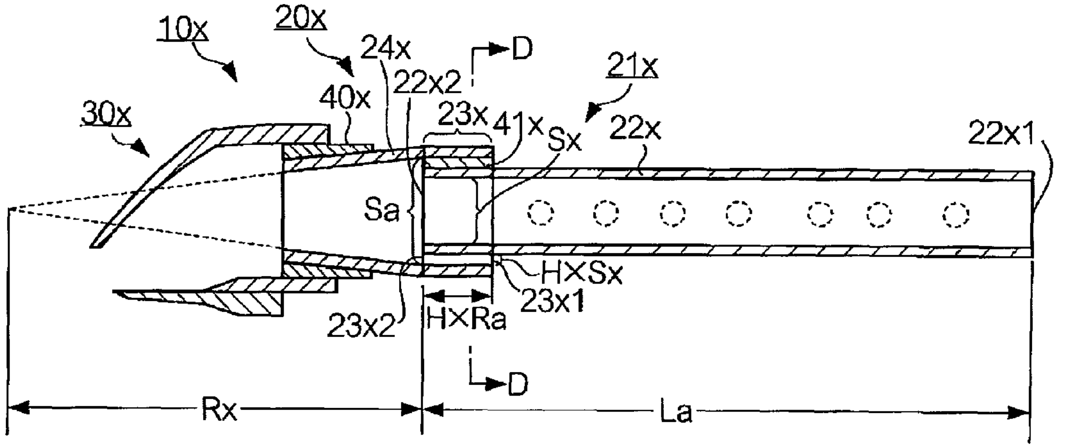
FIG. 28A is a longitudinal sectional view of a wind instrument including a mouthpiece and a pipe structure according to a twenty-second variation.
Figure 28B:
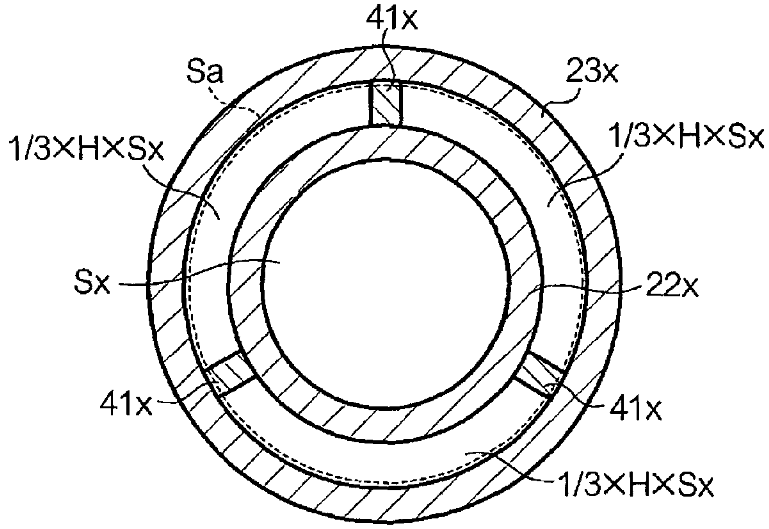
FIG. 28B is a cross-sectional view of the wind instrument taken along line D-D in FIG. 28A.

FIGS. 28A and 28B illustrate a wind instrument 10*x* having a pipe structure 20*x* according to the twenty-second variation, wherein parts equivalent to those shown in FIGS. 27A and 27B are designated by the reference numerals suffixed with "x" instead of "w"; hence, the description thereof will be omitted. FIG. 28A is a longitudinal sectional view of the wind instrument 10*x*, which is constituted of a main pipe 22*x*, an auxiliary pipe 23*x*, a blow member 24*x* and a mouthpiece 30*x*. The main pipe 22*x* having a cylindrical shape is partially inserted into the auxiliary pipe 23*x* having a cylindrical shape. The pipe structure 20*x* is composed of a metal such as brass and constituted such that two cylindrical pipes consisting of the main pipe 22*x* and the auxiliary pipe 23*x* are connected to the blow member 24*x*. The main pipe 22*x* is a cylindrical pipe having a length La and a sectional area Sx, whilst the auxiliary pipe 23*x* is a cylindrical pipe having a length H×Ra and an internal sectional area of H×Sx.

Openings 22*x*1 and 22*x*2 are formed at the opposite ends of the main pipe 22*x* in the length direction, whilst openings 23*x*1 and 23*x*2 are formed at the opposite ends of the auxiliary pipe 23*x* in the length direction. The opening 22*x*2 of the main pipe 22*x* and the opening 23*x*2 of the auxiliary pipe 23*x*3 are placed in the same plane in connection with the blow member 24*x* in the direction of the mouthpiece 30*x*. The mouthpiece 30*x* is connected to the blow member 24*x* via a cork member 40*x*. The auxiliary pipe 23*x* is connected to the main pipe 22*x* via supports 41*x*.

FIG. 28B is a cross-sectional view of the wind instrument 10*x* along with a line D-D in FIG. 28A. The internal space of the main pipe 22*x* is surrounded by the internal wall of the main pipe 22*x*, wherein it has the sectional area Sx. The internal space of the auxiliary pipe 23*x* is surrounded by the internal wall of the auxiliary pipe 23*x*, the external wall of the main pipe 22*x* and the side walls of the supports 41*x*, wherein it has the sectional area H×Sx. In the twenty-second variation shown in FIG. 28B, the internal space of the auxiliary pipe 23*x* is divided into three divisions via three supports 41*x*, wherein each division has a sectional area of ⅓×H×Sx. That is, the internal space of the main pipe 22*x* and the internal space of the auxiliary pipe 23*x* constitute parts of a circular shape, wherein the sum of those spaces is approximately equal to the sectional area Sa of a circular shape (i.e. an internal-wall shape of the auxiliary pipe 23*x*). According to this constitution, the wind instrument 10*x* approximates an imaginary wind instrument having a tapered pipe in which Sa denotes the sectional area of the upper base, and Ra denotes the distance between the upper base and the vertex.

Figure 32:
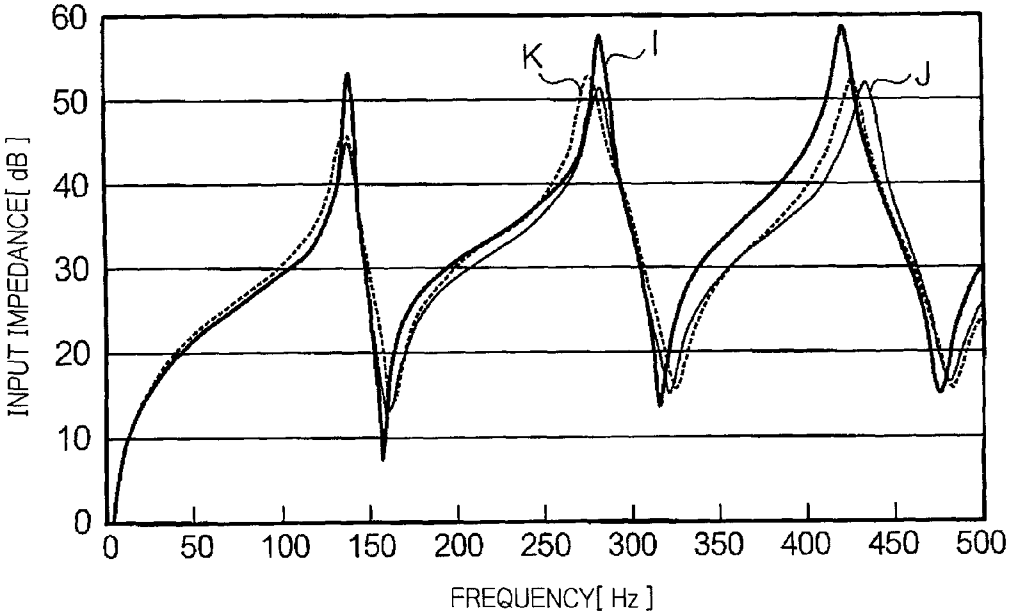
FIG. 32 is a graph showing acoustic characteristics of the wind instrument of the twenty-second variation shown in FIGS. 28A and 28B in comparison with other wind instruments.

FIG. 32 illustrates acoustic characteristics of the wind instrument 10*x* of the twenty-second variation. In FIG. 32, I denotes an input impedance curve of the wind instrument 100*a* of FIG. 4 in which the mouthpiece 130*a* is connected to the conical pipe (i.e. the pipe unit 120*a*); J denotes an input impedance curve of the wind instrument 10*a* of FIG. 6B in which the branch pipe 21*a* approximates the blow member 24*a* and onwards so as to approximate the structure of FIG. 4, in which both the sectional area of the terminal end of the blow member (i.e. the tapered pipe 124*a*) and the sectional area of the main pipe 22*a* are equal to Sa so that the sum of the sectional area of the main pipe 22*a* and the sectional area of the auxiliary pipe 23*a* becomes larger than the sectional area Sa of the terminal end of the blow member, and in which all the sound holes are closed; and K denotes an input impedance curve of the wind instrument 10*x* of the twenty-second variation in which the sum of the sectional area Sx of the main pipe 22*x* and the sectional area H×Sx of the auxiliary pipe 23*x* is approximately equal to the sectional area (i.e. Sa shown in FIG. 4) of the terminal end of the blow member (i.e. the tapered pipe 124*a*) and in which all the sound holes are closed.

Compared to the wind instrument 10*a* of the first embodiment (having the input impedance curve J) shown in FIG. 6B in which both the sectional area of the main pipe 22*a* and the sectional area of the terminal end of the blow member 24*a* are equal to Sa, the input impedance curve K of the twenty-second variation is close to the input impedance curve I of the original wind instrument 100*a* shown in FIG. 4 particularly in terms of the peak value of a low frequency component, so that the twenty-second variation achieves good acoustic characteristics.

Since the sum of the sectional area Sx of the main pipe 22*x* and the sectional area H×Sx of the auxiliary pipe 23*x* is approximate to the sectional area Sa of the blow-input portion (i.e. the tapered pipe 124*a*) of the original wind instrument 100*a* of FIG. 4, the wind instrument 10*x* is able to demonstrate a good blowing sensation (which is comparable to that of acoustic instruments) and the effects of the foregoing embodiments.

Since the auxiliary pipe 23*x* is arranged along and outside the main pipe 22*x*, the wind instrument 10*x* is not bulky in shape but has an adequate capacity. Instead of the constitution in which the auxiliary pipe 23*x* is not necessarily arranged outside the main pipe 22*x*, it is possible to employ another constitution in which the auxiliary pipe 23*x* is vertically branched from the terminal end of the blow member 24*x*. In this constitution, the sum of the sectional area Sx of the main pipe 22*x* and the sectional area H×Sx of the auxiliary pipe 23*x* does not need to be identified with the sectional area Sa of the blow-input portion of the original wind instrument 100*a* of FIG. 4, whereas the sum of the sectional areas Sx and H×Sx can be smaller than the sectional area Sa of the blow-input portion of the original wind instrument 100*a* of FIG. 4 in order to adjust a blowing sensation. That is, it is possible to increase a blowing resistance on the condition that the sum of the input sectional area Sx of the main pipe 22*x* and the input sectional area H×Sx of the auxiliary pipe 23*x* remains lower than the terminal sectional area Sa of the blow member 24*x*.

Lastly, the present invention is not necessarily limited to the foregoing embodiments and variations, which can be further modified in various ways within the scope of the invention as defined by the appended claims.

What is claimed is:

1. A pipe structure of a wind instrument comprising:

a blow member connectable to a mouthpiece; and a branch pipe composed of a main pipe and an auxiliary pipe joined to the main pipe, and configured to simulate a tapered pipe, wherein the blow member is connected to the branch point of the branch pipe at a point where the auxiliary pipe joins the main pipe, wherein the auxiliary pipe has an open distal end, wherein the main pipe has a first adjuster that adjusts a pitch sounded by the wind instrument, wherein the auxiliary pipe has a second adjuster that varies a length of an air column resonating inside the auxiliary pipe, and wherein the branch pipe is configured to allow an air blown into the blow member to flow through the main pipe and the auxiliary pipe.

2. The pipe structure of a wind instrument according to claim 1, wherein the first adjuster comprises a sound hole, a bypass pipe or a slide pipe.

3. The pipe structure of a wind instrument according to claim 1, wherein the main pipe and the auxiliary pipe are straight pipes having different lengths.

4. The pipe structure of a wind instrument according to claim 1, wherein:

the second adjuster comprises at least one closable open hole formed on a side wall of the auxiliary pipe, and the length of an air column resonating inside the auxiliary pipe varies in response to closing or opening of the closable open hole.

5. The pipe structure of a wind instrument according to claim 1, wherein:

the second adjuster comprises a slide pipe movable within the auxiliary pipe, and the length of an air column resonating inside the auxiliary pipe varies in response to a sliding operation of the slide pipe.

6. The pipe structure of a wind instrument according to claim 1, wherein:

the first adjuster comprises a bypass pipe attached to the main pipe, and a length of an air column resonating inside the main pipe varies in response to a pass-through switched over from an internal path of the main pipe to the bypass pipe.

7. The pipe structure of a wind instrument according to claim 3, wherein the main pipe has a passageway having a constant diameter.

8. The pipe structure of a wind instrument according to claim 1, wherein the blow member has a tapered passageway that is wider toward the branch pipe.

9. The pipe structure of a wind instrument according to claim 1, wherein the length of an air column resonating inside the auxiliary pipe is shortenable with the second adjuster to prevent unexpected variations of a tone color when a high pitch sound is produced.

10. A wind instrument comprising:

a mouth piece; and a pipe structure comprising:

a blow member connected to the mouthpiece; and a branch pipe composed of a main pipe and an auxiliary pipe joined to the main pipe, and configured to simulate a tapered pipe, wherein the blow member is connected to the branch pipe at a point where the auxiliary pipe joins the main pipe, wherein the auxiliary pipe has an open distal end, wherein the main pipe has a first adjuster that adjusts a pitch sounded by the wind instrument, wherein the auxiliary pipe has a second adjuster that varies a length of an air column resonating inside the auxiliary pipe, and wherein the branch pipe is configured to allow an air blown into the blow member to flow through the main pipe and the auxiliary pipe.

11. The wind instrument according to claim 10, wherein the first adjuster comprises a sound hole, a bypass pipe or a slide pipe.

12. The wind instrument according to claim 10, wherein the main pipe and the auxiliary pipe are straight pipes having different lengths.

13. The wind instrument according to claim 10, wherein:

the second adjuster comprises at least one closable open hole formed on a side wall of the auxiliary pipe, and the length of an air column resonating inside the auxiliary pipe varies in response to opening or closing of the closable open hole.

14. The wind instrument according to claim 10, wherein:

the second adjuster comprises a slide pipe movable within the auxiliary pipe, and the length of an air column resonating inside the auxiliary pipe varies in response to a sliding operation of the slide pipe.

15. The wind instrument according to claim 10, wherein:

the first adjuster comprises a bypass pipe attached to the main pipe, and a length of an air column resonating inside the main pipe varies in response to a pass-through switched over from an internal path of the main pipe to the bypass pipe.

16. The wind instrument according to claim 12, wherein the main pipe has a passageway having a constant diameter.

17. The wind instrument according to claim 10, wherein the blow member has a tapered passageway that is wider toward the branch pipe.

18. The wind instrument according to claim 10, wherein the length of an air column resonating inside the auxiliary pipe is shortenable with the second adjuster to prevent unexpected variations of a tone color when a high pitch sound is produced.

19. A method of operating a wind instrument comprising:

a mouth piece; and a pipe structure comprising:

a blow member connected to the mouthpiece; and a branch pipe composed of a main pipe and an auxiliary pipe joined to the main pipe, and configured to simulate a tapered pipe, wherein the blow member is connected to the branch pipe at a point where the auxiliary pipe joins the main pipe, wherein the auxiliary pipe has an open distal end, wherein the main pipe has a first adjuster that adjusts a pitch sounded by the wind instrument, wherein the auxiliary pipe has a second adjuster that varies a length of an air column resonating inside the auxiliary pipe, wherein the branch pipe is configured to allow an air blown into the blow member to flow through the main pipe and the auxiliary pipe, the method comprising the steps of:

blowing air through the mouth piece while maintaining the open distal end of the auxiliary pipe unobstructed; and operating the second adjuster to vary the length of the air column resonating inside the auxiliary pipe while maintaining the open distal end of the auxiliary pipe unobstructed.

20. The method according to claim 19, wherein the blow member has a tapered passageway that is wider toward the branch pipe.

21. The method according to claim 19, further comprising the step of operating the second adjuster to shorten the length of an air column resonating inside the auxiliary pipe while a high pitch is produced to prevent unexpected variations of a tone color, while maintaining the open distal end of the auxiliary pipe unobstructed.

* * * * *